United States Patent
Ueyama et al.

(10) Patent No.: US 12,399,129 B2
(45) Date of Patent: Aug. 26, 2025

(54) OPTICAL SENSOR AND SHEET RECOGNITION UNIT

(71) Applicant: Glory Ltd., Himeji (JP)

(72) Inventors: Naoki Ueyama, Himeji (JP); Takeshi Sato, Himeji (JP)

(73) Assignee: GLORY LTD., Himeji (JP)

( * ) Notice: Subject to any disclaimer, the term of this patent is extended or adjusted under 35 U.S.C. 154(b) by 283 days.

(21) Appl. No.: 17/947,189

(22) Filed: Sep. 19, 2022

(65) Prior Publication Data

US 2023/0015962 A1    Jan. 19, 2023

Related U.S. Application Data

(63) Continuation of application No. PCT/JP2021/011485, filed on Mar. 19, 2021.

(30) Foreign Application Priority Data

Mar. 23, 2020 (JP) ................................. 2020-051465

(51) Int. Cl.
| | | |
|---|---|---|
| *G01N 21/86* | (2006.01) | |
| *G01N 21/64* | (2006.01) | |
| *G07D 7/121* | (2016.01) | |

(52) U.S. Cl.
CPC ............ *G01N 21/86* (2013.01); *G01N 21/64* (2013.01); *G07D 7/121* (2013.01); *G01N 2021/8663* (2013.01)

(58) Field of Classification Search
None
See application file for complete search history.

(56) References Cited

U.S. PATENT DOCUMENTS

| | | |
|---|---|---|
| 2012/0127543 A1 | 5/2012 | Okada et al. |
| 2017/0276543 A1 | 9/2017 | Bogaki et al. |

FOREIGN PATENT DOCUMENTS

| | | | |
|---|---|---|---|
| JP | 6-204444 A | 7/1994 | |
| JP | 9-305820 A | 11/1997 | |
| JP | H09-305820 | * 11/1997 | ............... G07D 7/00 |
| JP | 2016-9445 A | 1/2016 | |
| JP | 2016-53783 A | 4/2016 | |
| JP | 2018-169881 A | 11/2018 | |
| WO | 2010/119650 A1 | 10/2010 | |
| WO | 2016/035760 A1 | 3/2016 | |

OTHER PUBLICATIONS

International Search Report and Written Opinion mailed on Jun. 1, 2021, received for PCT Application PCT/JP2021/011485, filed on Mar. 19, 2021, 9 pages including English Translation.

* cited by examiner

*Primary Examiner* — Edwin C Gunberg
(74) *Attorney, Agent, or Firm* — XSENSUS LLP

(57) ABSTRACT

The optical sensor of the present disclosure includes: a light source configured to emit irradiation light to a target; a light receiver configured to receive a first incident light, a second incident light, and a third incident light travelling from the target and having different wavelength bands; and a controller configured to control the light source. The light receiver includes: a first light-receiving element configured to receive the first incident light and the second incident light and not to receive the third incident light; and a second light-receiving element configured to receive the third incident light and to receive neither the first incident light nor the second incident light.

16 Claims, 16 Drawing Sheets

OPTICAL SENSOR AND SHEET RECOGNITION UNIT

CROSS-REFERENCE TO RELATED APPLICATIONS

The present application is a Continuation application of PCT Application No. PCT/JP2021/011485 filed on Mar. 19, 2021, which claims priority to Japanese Patent Application No. 2020-051465 filed on Mar. 23, 2020 under the Paris Convention and provisions of national law in a designated State. The entire contents of each application are hereby incorporated by reference.

TECHNICAL FIELD

The present disclosure relates to optical sensors and sheet recognition units. The present disclosure specifically relates to an optical sensor and a sheet recognition unit capable of acquiring image data derived from a plurality of types of light having different wavelength bands.

BACKGROUND

Current banknote recognition units execute processes such as recognition of the denominations of banknotes, authenticity determination, fitness determination, and serial number recognition. For example, a banknote is read by an optical line sensor of a banknote recognition unit and an image thereof is analyzed, so that processes are executed such as recognition of the denomination of the banknote, determination of the authenticity of the banknote, determination of the fitness of the banknote, and letter recognition of the serial number printed on the banknote.

Recent banknotes tend to be provided with an increased number of security elements and, as the number of security elements increases, the number of types of data to be acquired for banknote recognition increases. For example, an optical line sensor acquires image data for each predetermined wavelength band and, as the number of security elements increases, requires acquiring image data for a greater number of types of wavelength bands. On the other hand, the period of time of one cycle of acquiring image data for banknote recognition is limited. Thus, the optical line sensor requires acquiring a greater number of types of image data within a limited period of time.

For example, JP 2016-53783 A discloses a technique for forming a plurality of types of images derived from a plurality of light having different wavelength bands, specifically a technique in which a banknote is irradiated with red light, green light, blue light, and infrared light having different wavelength bands from light sources while overlapping the light-emitting timings thereof and the lights are simultaneously received by four light-receiving elements provided with four respective types of bandpass filters that transmit only the corresponding light among red light, green light, blue light, and infrared light forming four types of image data derived from red light, green light, blue light, and infrared light. This technique allows for acquisition of a greater number of types of image data per cycle than in the case of successively lighting the light sources for the respective wavelength bands and successively receiving the lights with a single light-receiving element, resulting in an increased resolution of the image.

SUMMARY

An optical sensor according to a first aspect of the present disclosure includes: a light source configured to emit irradiation light to a target; a light receiver configured to receive a first incident light, a second incident light, and a third incident light travelling from the target and having different wavelength bands; and a controller configured to control the light source, the light receiver including: a first light-receiving element configured to receive the first incident light and the second incident light and not to receive the third incident light; and a second light-receiving element configured to receive the third incident light and to receive neither the first incident light nor the second incident light.

DESCRIPTION OF EMBODIMENTS

Figure 1:
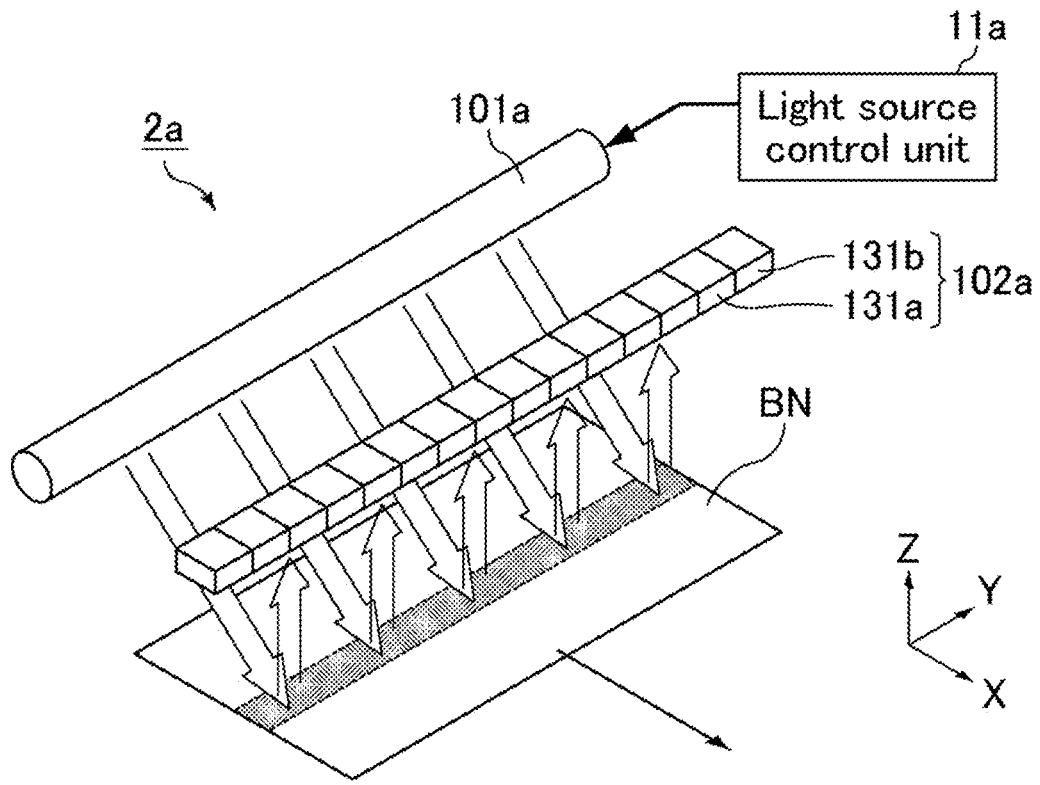
FIG. 1 is a schematic perspective view of a structure of an optical sensor according to Embodiment 1.

Unfortunately, the technique disclosed in JP 2016-53783 A can detect only one type of light with one type of a light-receiving element. In other words, the system requires as many types of light-receiving elements as types of light to be detected. Thus, increasing the number of types of light to be detected requires increasing the number of types of light-receiving elements to the same number. This may resultantly cause issues such as a lowered resolution of an image as well as a reduced light-receiving area per light-receiving element and subsequently a reduced amount of light received.

A plurality of types of light may be received by one light-receiving element at different timings. In this case, an increased number of types of light can be received while an increase in the number of types of light-receiving elements is reduced. However, this structure fails to receive a plurality of types of light simultaneously, causing an issue of prolonged duration of one cycle.

The present disclosure has been made in view of the above current state of the art and aims to provide an optical sensor and a sheet recognition unit capable of detecting at least three types of light having different wavelength bands using fewer light-receiving elements than the number of the types of light and capable of simultaneously receiving at least two types of light among the three types of light using these light-receiving elements.

In order to solve the above issue and achieve an object, (1) an optical sensor according to a first aspect of the present disclosure includes: a light source configured to emit irradiation light to a target; a light receiver configured to receive a first incident light, a second incident light, and a third incident light travelling from the target and having different wavelength bands; and a controller unit configured to control the light source, the light receiver including: a first light-receiving element configured to receive the first incident light and the second incident light and not to receive the third incident light; and a second light-receiving element configured to receive the third incident light and to receive neither the first incident light nor the second incident light.

(2) In the optical sensor according to the above (1), the first light-receiving element may include a filter configured to allow transmission of the first incident light and the second incident light and to reduce transmission of the third incident light, and the second light-receiving element may include: a filter configured to allow transmission of the third incident light and to reduce transmission of one of the first incident light and the second incident light; and a filter configured to reduce transmission of the other of the first incident light and the second incident light.

(3) In the optical sensor according to the above (1) or (2), the light source may be configured to emit at least a first irradiation light, a second irradiation light, and a third irradiation light having different wavelength bands, the first incident light may be light generated from the first irradiation light while the first irradiation light is applied to the target, the second incident light may be light generated from the second irradiation light while the second irradiation light is applied to the target, and the third incident light may be a light generated from the third irradiation light while the third irradiation light is applied to the target.

(4) In the optical sensor according to the above (3), the first incident light may be light generated by transmission of the first irradiation light through the target and/or reflection of the first irradiation light on the target, the second incident light may be light generated by transmission of the second irradiation light through the target and/or reflection of the second irradiation light on the target, and the third incident light may be light generated by transmission of the third irradiation light through the target and/or reflection of the third irradiation light on the target.

(5) In the optical sensor according to the above (3) or (4), the controller may be configured to cause the light source to emit the first irradiation light and the second irradiation light at different timings.

(6) In the optical sensor according to any one of the above (3) to (5), the controller may be configured to cause the light source to emit the third irradiation light and at least one of the first irradiation light or the second irradiation light at the same timing.

(7) In the optical sensor according to any one of the above (3) to (6), the light receiver may further include a third light-receiving element configured to: receive a fourth incident light having a wavelength band different from the wavelength bands of the first incident light, the second incident light, and the third incident light; and receive none of the first incident light, the second incident light, and the third incident light.

(8) In the optical sensor according to the above (7), the light source may be further configured to emit a fourth irradiation light to the target, the fourth irradiation light having a wavelength band different from the wavelength bands of the first irradiation light, the second irradiation light, and the third irradiation light, and the fourth incident light may be light generated from the fourth irradiation light while the fourth irradiation light is applied to the target.

(9) In the optical sensor according to the above (8), the fourth incident light may be light generated by transmission of the fourth irradiation light through the target and/or reflection of the fourth irradiation light on the target.

(10) In the optical sensor according to the above (8) or (9), the controller may be configured to cause the light source to emit the fourth irradiation light and at least one of the first irradiation light or the second irradiation light at the same timing.

(11) In the optical sensor according to the above (1) or (2), the light receiver may further include a third light-receiving element configured to: receive a fourth incident light having a wavelength band different from the wavelength bands of the first incident light, the second incident light, and the third incident light; and receive none of the first incident light, the second incident light, and the third incident light.

(12) In the optical sensor according to any one of the above (7) to (11), a combination of the first incident light, the second incident light, the third incident light, and the fourth incident light may be a combination of infrared light, red light, green light, and blue light.

(13) In the optical sensor according to the above (12), a combination of the first incident light and the second incident light may be a combination of infrared light and blue light, and a combination of the third incident light and the fourth incident light may be a combination of red light and green light.

(14) In the optical sensor according to the above (13), the light source may include: a first light source configured to emit infrared light, blue light, red light, and green light to a light receiver side of the target; and a second light source configured to emit green light to an opposite side of the target.

(15) In the optical sensor according to the above (14), the second light source may be configured to emit infrared light to the opposite side of the target, the controller may be configured to cause the second light source to emit infrared light to the opposite side of the target and green light to the opposite side of the target at the same timing, the first light-receiving element may be configured to receive infrared light transmitted through the target as the first incident light or the second incident light, and the second light-receiving element may be configured to receive green light transmitted through the target as the third incident light.

(16) In the optical sensor according to the above (12), a combination of the first incident light and the second incident light may be a combination of infrared light and green light, and a combination of the third incident light and the fourth incident light may be a combination of red light and blue light.

(17) In the optical sensor according to the above (12), a combination of the first incident light and the second incident light may be a combination of infrared light and red light, and a combination of the third incident light and the fourth incident light may be a combination of green light and blue light.

(18) In the optical sensor according to any one of the above (12) to (17), the infrared light may have a peak wavelength at 750 nm or longer, the red light may have a peak wavelength at 600 nm or longer and shorter than 750 nm, the green light may have a peak wavelength at 500 nm or longer and shorter than 600 nm, and the blue light may have a peak wavelength at 400 nm or longer and shorter than 500 nm.

(19) A sheet recognition unit according to a second aspect of the present disclosure includes the optical sensor according to any one of the above (1) to (18).

The optical sensor and the sheet recognition unit of the present disclosure can detect at least three types of light having different wavelength bands using fewer light-receiving elements than the number of the types of light and can simultaneously receive at least two types of light among the three types of light using these light-receiving elements.

Embodiments of the optical sensor and the sheet recognition unit of the present disclosure are described hereinbelow with reference to the drawings. Various objects are applicable as targets used in the present disclosure. In the following, the present disclosure describes as an example a unit for handling a sheet as a target. Various sheets such as banknotes, checks, vouchers, bills, business forms, documents of value, and card-like media are applicable as sheets used in the disclosure. Still, in the following, the disclosure describes as an example a unit for handling a banknote. Described in the following is a case where the optical sensor of the present disclosure has a function of an optical line sensor including a plurality of pixels composed of a plurality of light-receiving elements arranged in the main scanning direction. Hereinafter, like reference signs refer to the same portions or portions having the same function throughout the drawings, and such portions that have been already described are not elaborated upon as appropriate. The figures for illustrating the structures show the XYZ-coordinate system as appropriate in which the X, Y, and Z axes are perpendicular to each other.

The term "reflection image" herein means an image based on distribution of the intensity of light that has been applied to a target and reflected on the target. The term "transmission image" means an image based on distribution of the intensity of light that has been applied to a target and transmitted through the target.

Embodiment 1

Figure 2:
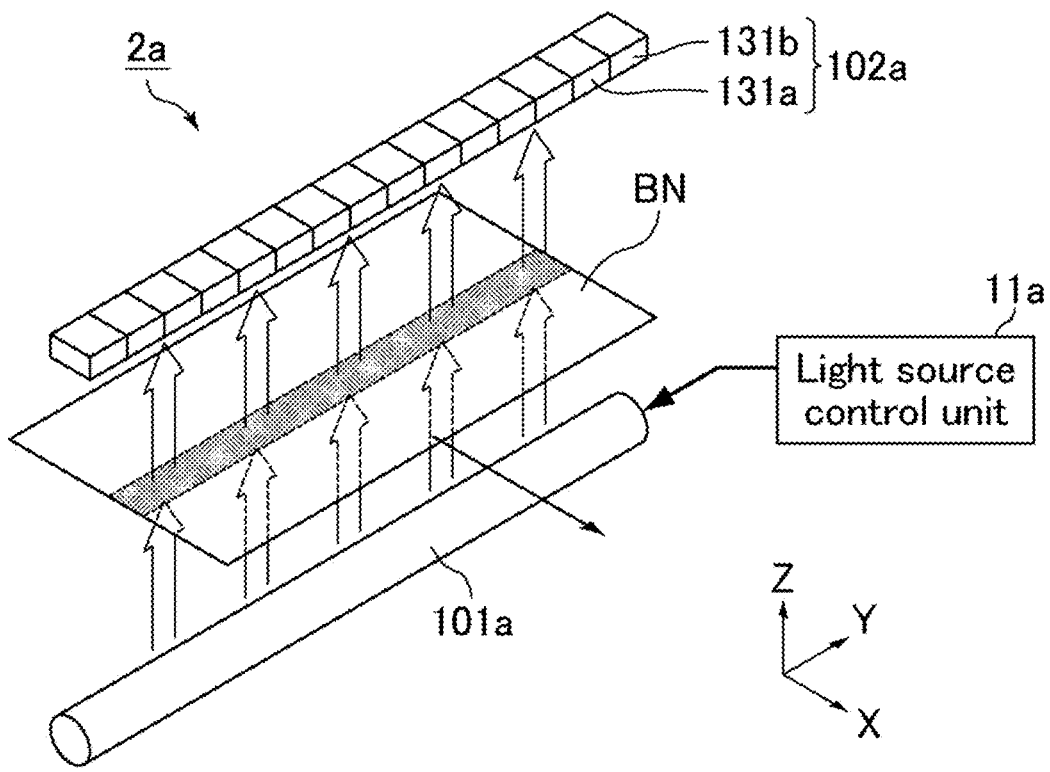
FIG. 2 is a schematic perspective view of another structure of the optical sensor according to Embodiment 1.

The structure of the optical sensor of the present embodiment is described with reference to FIG. 1 and FIG. 2. As shown in FIG. 1 and FIG. 2, an optical sensor 2a of the present embodiment detects light from a banknote BN and includes a light source 101a, a light-receiving unit (light receiver) 102a, and a light source control unit 11a.

The banknote BN may be transported in the X direction in the XY plane. In this case, the Y direction may correspond to the main scanning direction of the optical sensor 2a and the X direction may correspond to the sub-scanning direction of the optical sensor 2a.

The light source 101a emits irradiation light to the banknote BN. The light source 101a may be provided on the same side as the light-receiving unit 102a relative to the banknote BN as shown in FIG. 1, or alternatively may be provided on the side opposite to the light-receiving unit 102a relative to the banknote BN as shown in FIG. 2. The light source 101a may emit irradiation light extending linearly in the Y direction (main scanning direction) to the banknote BN.

The light source 101a and the light-receiving unit 102a may extend over the entire width of the transport path of a banknote handling device to be provided with the optical sensor 2a, and the optical sensor 2a may function as an optical line sensor that acquires optical data (optical features) of the banknote BN over the entire width of the transport path.

The light source 101a may emit any types of irradiation light. The light source 101a may emit at least a first irradiation light, a second irradiation light, and a third irradiation light having different wavelength bands.

The first irradiation light, the second irradiation light, and the third irradiation light emitted from the light source 101a may be, for example, at least three types of light having different wavelength bands selected from infrared light, red light, green light, blue light, and ultraviolet light. Herein, infrared light may include infrared lights having different wavelength bands and ultraviolet light may include ultraviolet lights having different wavelength bands.

The light-receiving unit 102a receives a first incident light, a second incident light, and a third incident light traveling from the banknote BN and having different wavelength bands.

The first incident light, the second incident light, and the third incident light received by the light-receiving unit 102a may be, for example, at least three types of light having different wavelength bands selected from infrared light, red light, green light, and blue light. Herein, infrared light may include infrared lights having different wavelength bands.

The first incident light may be light generated from the first irradiation light while the first irradiation light is applied to the banknote BN, or may be light generated from the first irradiation light after the first irradiation light is applied to the banknote BN and while the light source 101a is turned off.

Similarly, the second incident light may be light generated from the second irradiation light while the second irradiation light is applied to the banknote BN, or may be light generated from the second irradiation light after the second irradiation light is applied to the banknote BN and while the light source 101a is turned off.

Also, the third incident light may be light generated from the third irradiation light while the third irradiation light is applied to the banknote BN, or may be light generated from the third irradiation light after the third irradiation light is applied to the banknote BN and while the light source 101a is turned off.

Specifically, the first incident light may be light generated by transmission of the first irradiation light through the banknote BN, or may be light generated by reflection of the first irradiation light on the banknote BN, or may be fluorescence generated from excitation light (e.g., ultraviolet light) used as the first irradiation light while the excitation light is applied to the banknote BN, or may be phosphorescence generated from excitation light (e.g., ultraviolet light) used as the first irradiation light after the excitation light is applied to the banknote BN and while the light source 101a is turned off.

Similarly, the second incident light may be light generated by transmission of the second irradiation light through the banknote BN, or may be light generated by reflection of the second irradiation light on the banknote BN, or may be fluorescence generated from excitation light (e.g., ultraviolet light) used as the second irradiation light while the excitation light is applied to the banknote BN, or may be phosphorescence generated from excitation light (e.g., ultraviolet light) used as the second irradiation light after the excitation light is applied to the banknote BN and while the light source 101a is turned off.

Also, the third incident light may be light generated by transmission of the third irradiation light through the banknote BN, or may be light generated by reflection of the third irradiation light on the banknote BN, or may be fluorescence generated from excitation light (e.g., ultraviolet light) used as the third irradiation light while the excitation light is applied to the banknote BN, or may be phosphorescence generated from excitation light (e.g., ultraviolet light) used as the third irradiation light after the excitation light is applied to the banknote BN and while the light source 101a is turned off.

The light source control unit 11a controls the light source 101a. In other words, the light source control unit 11a controls turning on and off of the light source 101a.

The light-receiving unit 102a includes a first light-receiving element (imaging element) 131a that receives the first incident light and the second incident light and that does not receive the third incident light, and a second light-receiving element (imaging element) 131b that receives the third incident light and that receives neither the first incident light nor the second incident light. In other words, the first light-receiving element 131a can detect the first incident light and the second incident light but cannot detect the third incident light, while the second light-receiving element 131b can detect the third incident light but can detect neither the first incident light nor the second incident light. This enables detection of three types of incident light (first, second, and third incident lights) having different wavelength bands using the two types of the light-receiving elements 131a and 131b. In other words, a plurality of types of light having different wavelength bands can be detected using fewer types of light-receiving elements than the number of the types of light. This can reduce the space for arranging the light-receiving elements to detect the first, second, and third incident lights and can make a vacancy within the space for arranging the light-receiving elements. Therefore, for example, this vacancy within the space for arranging the light-receiving elements may be utilized to arrange a plurality of light-receiving elements of the same type, improving the resolution. Alternatively, this vacancy within the space for arranging the light-receiving elements may be utilized to increase the area per light-receiving element, increasing the amount of light received by the light-receiving element and increasing the sensitivity of the light-receiving element. Alternatively, this vacancy within the space for arranging the light-receiving elements may be utilized to arrange a plurality of light-receiving elements of the same type and to increase the area per light-receiving element, improving the resolution and increasing the sensitivity of the light-receiving element.

The above structure also enables reception of the first incident light or the second incident light and the third incident light simultaneously. In other words, the two types of the light-receiving elements 131a and 131b can simultaneously receive two types of incident light among the first incident light, the second incident light, and the third incident light. This can resultantly reduce the duration of one cycle as compared with the case where a light-receiving element receives a plurality of types of light at different timings.

The light-receiving unit 102a may include a plurality of pixels arranged in line along the main scanning direction (Y direction) of the optical sensor 2a. Each pixel may include one or more first light-receiving elements 131a and one or more second light-receiving elements 131b. In other words, the light-receiving unit 102a may include a plurality of the first light-receiving elements 131a and a plurality of the second light-receiving elements 131b, and the first light-receiving elements 131a and the second light-receiving elements 131b may be arranged in the main scanning direction (Y direction) of the optical sensor 2a.

The light source control unit 11a may cause the light source 101a to emit the first irradiation light and the second irradiation light at different timings. Thereby, the first light-receiving element 131a can receive the first incident light and the second incident light at different timings.

The light source control unit 11a may cause the light source 101a to emit the third irradiation light and at least one of the first irradiation light or the second irradiation light at the same timing. Thereby, the second light-receiving element 131b can receive the third incident light and simultaneously the first light-receiving element 131a can receive the first incident light or the second incident light.

The light source control unit 11a may function in response to execution of a corresponding program by a control unit (controller) 10 to be described later.

Embodiment 2

Summary of Present Embodiment

Figure 3:
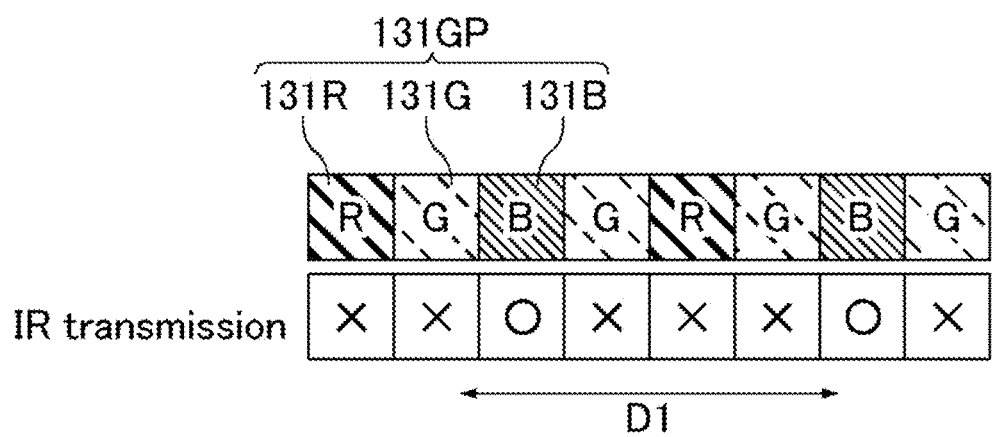
FIG. 3 is a diagram for illustrating the outline of Embodiment 2.

First, the present embodiment is summarized with reference to FIG. 3. As shown in FIG. 3, the light-receiving unit (light receiver) of the optical sensor of the present embodiment includes a plurality of pixels 131GP arranged in line along the main scanning direction D1, each of which includes a light-receiving element (hereinafter, also referred to as a blue light-receiving element) 131B provided with a blue color filter that transmits infrared light, a light-receiving element (hereinafter, also referred to as a green light-receiving element) 131G provided with a green color filter and an infrared cut-off filter, and a light-receiving element (hereinafter, also referred to as a red light-receiving element) 131R provided with a red color filter and an infrared cut-off filter. This structure allows the blue light-receiving element 131B serving as the first light-receiving element to receive incident lights of two types of wavelength bands (blue light that corresponds to the first incident light and infrared light that corresponds to the second incident light), allows the green light-receiving element 131G serving as the second light-receiving element to receive one type of incident light (green light that corresponds to the third incident light), and allows the red light-receiving element 131R serving as the third light-receiving element to receive one type of incident light (red light that corresponds to the fourth incident light).

This resultantly enables detection of four types of incident light (blue light, green light, red light, and infrared light) having different wavelength bands using the three types of the light-receiving elements 131B, 131G, and 131R. In other words, a plurality of types of light having different wavelength bands can be detected using fewer types of light-receiving elements than the number of the types of light. This can resultantly reduce the space for arranging the light-receiving elements to detect blue light, green light, red light, and infrared light and can make a vacancy within the space for arranging the light-receiving elements. Therefore, for example, this vacancy within the space for arranging the light-receiving elements may be utilized to arrange a plurality of light-receiving elements of the same type, improving the resolution. Alternatively, this vacancy within the space for arranging the light-receiving elements may be utilized to increase the area per light-receiving element, increasing the amount of light received by the light-receiving element and increasing the sensitivity of the light-receiving element. Alternatively, this vacancy within the space for arranging the light-receiving elements may be utilized to arrange a plurality of light-receiving elements of the same type and to increase the area per light-receiving element, improving the resolution and increasing the sensitivity of the light-receiving element.

The above structure also enables reception of blue light or infrared light as well as green light and/or red light simultaneously. In other words, the three types of the light-receiving elements 131B, 131G, and 131R can simultaneously receive at least two types of light among the four types of light. This can resultantly reduce the duration of one cycle as compared with the case where a light-receiving element receives a plurality of types of light at different timings.

<Structure of Banknote Handling Device>

Figure 4:
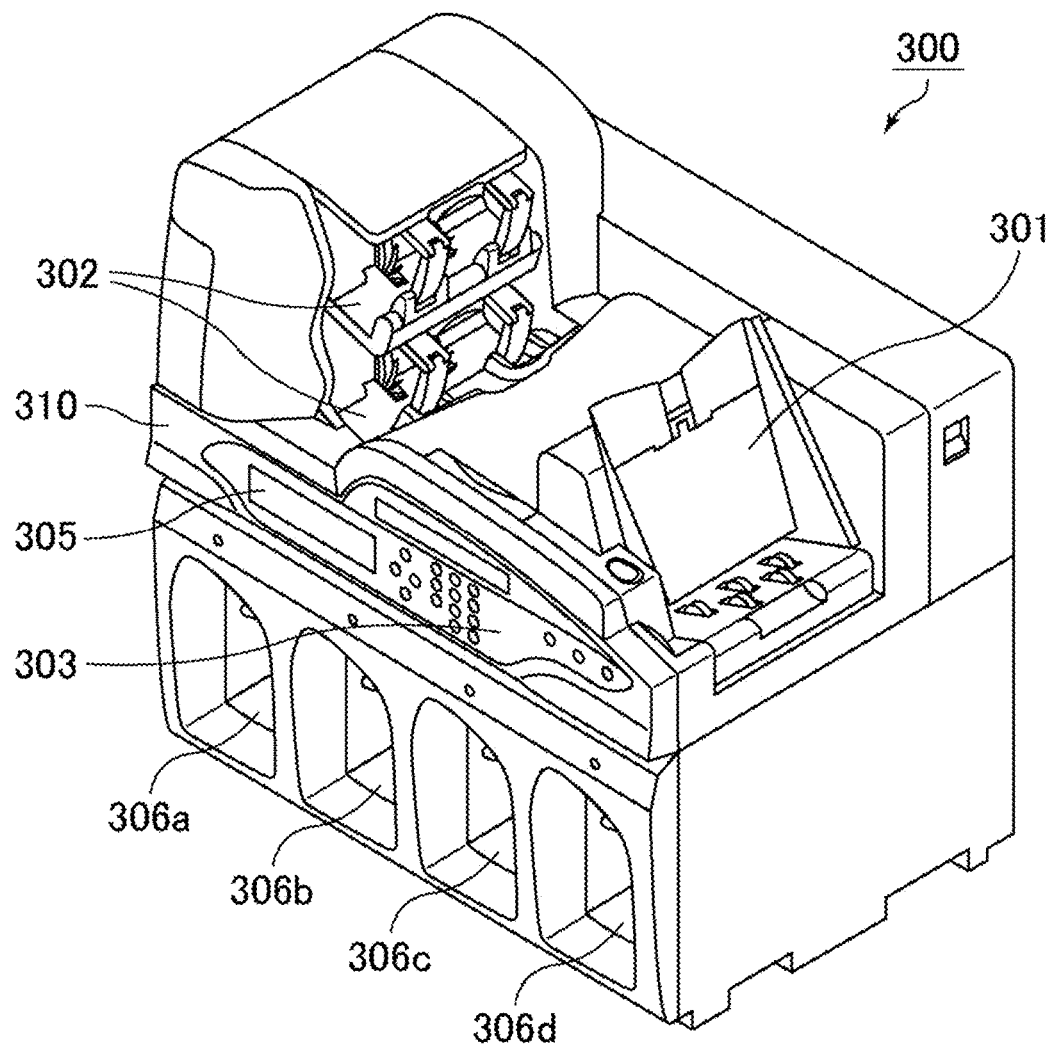
FIG. 4 is a schematic perspective view of the appearance of a banknote handling device of Embodiment 2.

Next, a structure of a banknote handling device of the present embodiment provided with the optical sensor is described with reference to FIG. 4. The banknote handling device of the present embodiment may have the structure shown in FIG. 4, for example. A banknote handling device 300 shown in FIG. 4 is a small banknote handling device to be used on a table, and includes the aforementioned optical sensor (not shown in FIG. 4) as well as a banknote recognition unit (not shown in FIG. 4) that executes recognition processing on banknotes, a hopper 301 that holds a plurality of banknotes to be processed in a stacked state, two rejection units 302 that dispense rejected banknotes, such as counterfeit notes and suspect notes, among the banknotes fed from the hopper 301 into a housing 310, an operation unit 303 that receives instructions from an operator, four stackers 306a to 306d that stack sorted banknotes whose denomination, authenticity, and fitness are recognized in the housing 310, and a display 305 that displays information such as the results of recognizing and counting banknotes and the stacking conditions of the stackers 306a to 306d. Based on the results of fitness determination by the banknote recognition unit, the stackers 306a to 306c among the four stackers 306a to 306d store fit notes, while the stacker 306d stores soiled notes. Any method may be used to sort the banknotes into the stackers 306a to 306d.

<Structure of Imaging Unit>

Figure 5:
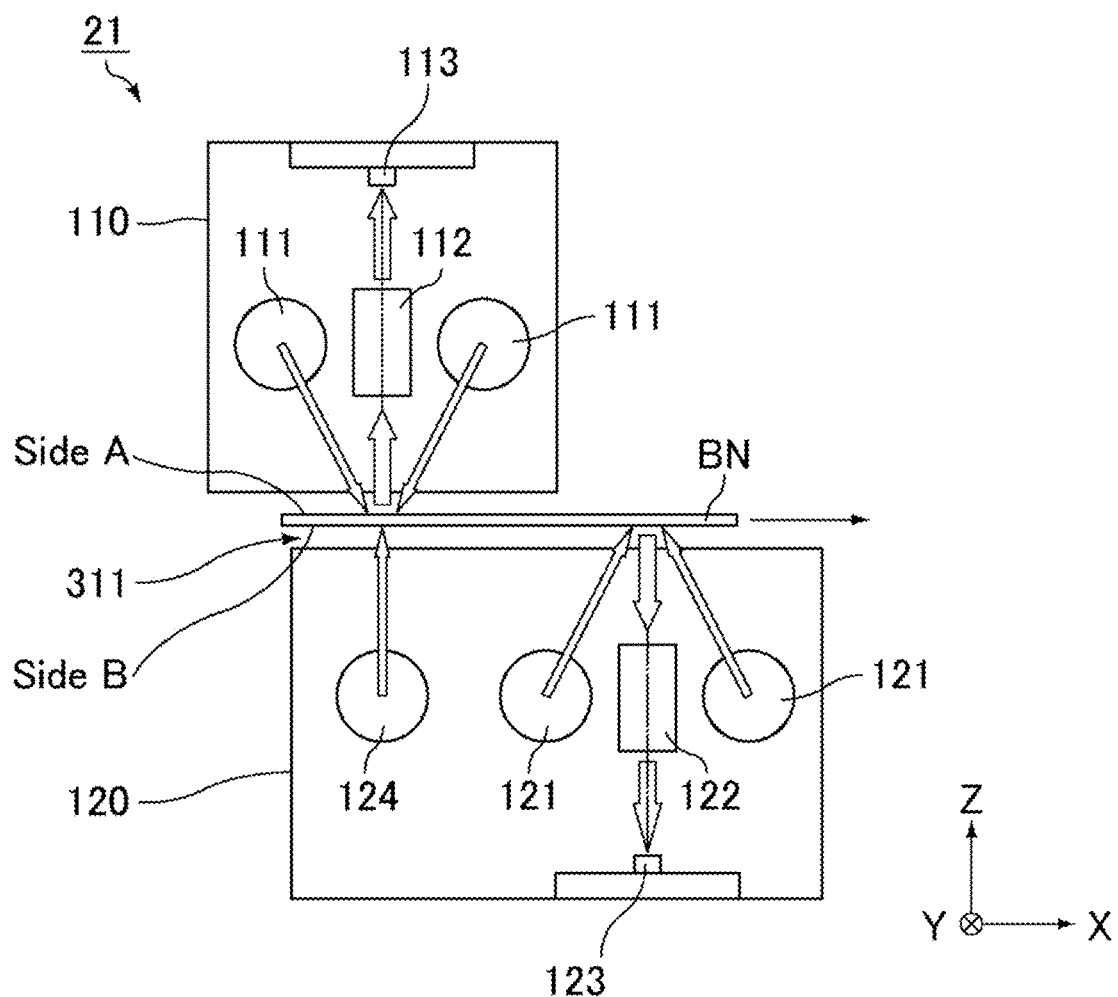
FIG. 5 is a schematic cross-sectional view of a structure of an imaging unit in a banknote recognition unit according to Embodiment 2.

Next, the structure of an imaging unit, which is the key device of the banknote recognition unit of the present embodiment, is described with reference to FIG. 5 and FIG. 6. As shown in FIG. 5, an imaging unit 21 includes an upper unit 110 and a lower unit 120 arranged to face each other. Between the upper unit 110 and the lower unit 120, which are apart from each other in the Z direction, is provided a space through which a banknotes BN is transported in the X direction in the XY plane. This space defines part of a transport path 311 of the banknote handling device of the present embodiment. The upper unit 110 and the lower unit 120 are located respectively above (in the positive Z direction) and below (in the negative Z direction) the transport path 311. The Y direction corresponds to the main scanning direction of the imaging unit 21 and the X direction corresponds to the sub-scanning direction of the imaging unit 21.

As shown in FIG. 5, the upper unit 110 includes two reflection light sources 111, a condensing lens 112, and a light-receiving unit (light receiver) 113. The reflection light sources 111 successively emit irradiation lights having different wavelength bands, specifically, first, second, and third infrared lights, white light including red light, green light, and blue light, and ultraviolet lights serving as excitation lights for fluorescence and phosphorescence, to a main surface (hereinafter, referred to as the side A) of a banknote BN on the side facing the light-receiving unit 113. The condensing lens 112 collects light emitted from the reflection light sources 111 and reflected on the side A of a banknote BN, light emitted from a transmission light source 124 in the lower unit 120 and transmitted through the banknote BN, and the fluorescence and phosphorescence emitted from the side A of the banknote BN. The light-receiving unit 113 receives the light collected by the condensing lens 112 and converts the light into an electrical signal. The light-receiving unit 113 then amplifies the electrical signal, converts the amplified signal into digital data by A/D conversion, and outputs the digital data as an image signal. The light received by a light-receiving unit is also referred to as incident light and the light emitted from a light source is also referred to as irradiation light.

The lower unit 120 includes two reflection light sources 121, one transmission light source 124, a condensing lens 122, and a light-receiving unit (light receiver) 123. The reflection light sources 121 emit irradiation lights having different wavelength bands, specifically, the first, second, and third infrared lights, for example, as well as white light including red light, green light, and blue light, and ultraviolet lights serving as excitation lights for fluorescence and phosphorescence, to a main surface (hereinafter referred to as the side B) of a banknote BN on the side facing the light-receiving unit 123. The condensing lens 122 collects light emitted from the reflection light sources 121 and reflected on the side B of a banknote BN and fluorescence and phosphorescence emitted from the side B of the banknote BN. The light-receiving unit 123 receives the light collected by the condensing lens 122 and converts the light into an electric signal. The light-receiving unit 123 then amplifies the electrical signal, converts the amplified signal into digital data by A/D conversion, and outputs the digital data as an image signal.

The transmission light source 124 is placed on the optical axis of the condensing lens 112 of the upper unit 110. The light emitted from the transmission light source 124 partially passes through the banknote BN, collected by the condensing lens 112 of the upper unit 110, and detected by the light-receiving unit 113. The transmission light source 124 simultaneously emits irradiation lights having different wavelength bands, specifically infrared light and green light, to the side B of the banknote BN.

The term "lights having different wavelength bands" (e.g., irradiation lights, incident lights) herein refers to, for example, lights having different colors for visible light. The term refers to, for example, lights having partially overlapping wavelength bands or lights having non-overlapping wavelength bands for each of infrared light and ultraviolet light.

Each of the light sources 111, 121, and 124 includes a linear light guide (not shown) extending in the direction (the main scanning direction D1) perpendicular to the plane of paper of FIG. 5 and a plurality of LED elements (not shown) at each end (or either end) of the light guide.

Each of the light sources 111 and 121 may include: an LED element that emits a first infrared light (IR1), an LED element that emits a second infrared light (IR2), and an LED element that emits a third infrared light (IR3) each having a peak wavelength of 750 nm or longer; an LED element that emits a red light (R) having a peak wavelength of not shorter than 600 nm but shorter than 750 nm; an LED element that emits a green light (G) having a peak wavelength of not shorter than 500 nm but shorter than 600 nm; and an LED element that emits a blue light (B) having a peak wavelength of not shorter than 400 nm but shorter than 500 nm. The first infrared light, the second infrared light, and the third infrared light are infrared lights having different peak wavelengths. For example, the first infrared light may have the longest peak wavelength, followed by the second infrared light and the second infrared light in descending order. The light sources 111 are provided separately on the upstream side and the downstream side of the transport direction across the condensing lens 112, and the light sources 121 are provided separately on the upstream side and the downstream side of the transport direction across the condensing lens 122.

The light source 124 may include an LED element that emits a green light (TG) having a peak wavelength of not shorter than 500 nm but shorter than 600 nm and an LED element that emits an infrared light (TIR) having a peak wavelength of not shorter than 750 nm. The peak wavelength refers to the wavelength at which the emission intensity of light is at its maximum.

Figure 6:
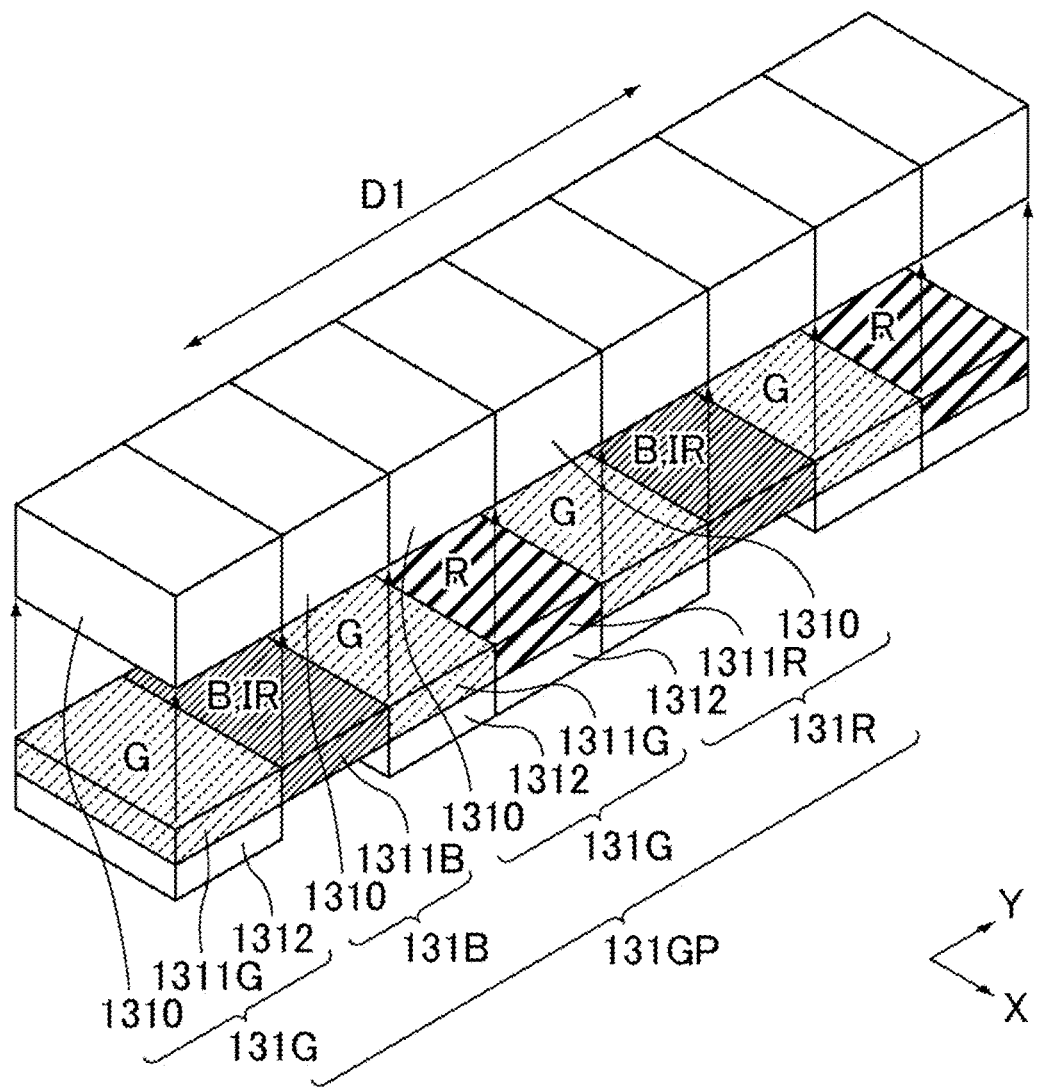
FIG. 6 is an enlarged schematic perspective view of a light-receiving unit in the banknote recognition unit according to Embodiment 2.

As shown in FIG. 6, the light-receiving units 113 and 123 each include a plurality of pixels 131GP arranged in line along the main scanning direction D1 (direction perpendicular to the transport direction for banknotes BN; Y direction). Each pixel 131GP includes one blue light-receiving element (imaging element) 131B that receives infrared light and blue light and that receives neither red light nor green light; two green light-receiving elements (imaging elements) 131G that receives green light and that receives none of infrared light, red light, and blue light; and one red light-receiving element (imaging element) 131R that receives red light and that receives none of infrared light, green light, and blue light. One green light-receiving element 131G, the blue light-receiving element 131B, the other green light-receiving element 131G, and the red light-receiving element 131R are arranged in this order in line along the main scanning direction D1.

The light-receiving element (imaging element) means an element that detects the intensity of light having a predetermined wavelength band (converts it into an electrical signal), and may include a photodetector such as a photodiode and a filter that is provided on the light-receiving surface of the photodetector and that reduces transmission of light having the wavelength bands other than the predetermined wavelength band to be detected.

The blue light-receiving element 131B includes a photodetector 1310 and a blue color filter 1311B that transmits infrared light and blue light and that absorbs red light and green light. Each green light-receiving element 131G includes a photodetector 1310, a green color filter 1311G that transmits infrared light and green light and that absorbs red light and blue light, and an infrared cut-off filter 1312 that cuts off infrared light. The red light-receiving element 131R includes a photodetector 1310, a red color filter 1311R that transmits infrared light and red light and that absorbs green light and blue light, and an infrared cut-off filter 1312 that cuts off infrared light. These filters each function as a filter to reduce transmission of the corresponding light through the filter.

Each of the upper unit 110 and the lower unit 120 repeatedly images a banknote BN being transported in the transport direction and outputs image signals. Thereby, the imaging unit 21 acquires an image of the entire banknote BN. Specifically, the imaging unit 21 acquires a transmission image of the banknote BN and a reflection image of the side A of the banknote BN based on the output signals from the upper unit 110, and acquires a reflection image of the side B of the banknote BN based on the output signals from the lower unit 120. In the present embodiment, each pixel 131GP includes one blue light-receiving element 131B, two green light-receiving elements 131G, and one red light-receiving element 131R arranged in the main scanning direction D1. Thus, for each of the side A and the side B of the banknote BN, a blue reflection image, a red reflection image, reflection images of the first to third infrared lights, and a reflection image of fluorescence are acquired at a resolution of 100 dpi in the main scanning direction D1. For each of the side A and the side B of the banknote BN, a green reflection image and a green transmission image are acquired at a resolution of 200 dpi in the main scanning direction D1.

Each pixel 131GP may include three light-receiving elements consisting of one blue light-receiving element 131B, one green light-receiving element 131G, and one red light-receiving element 131R. This can uniformly improve the resolutions of the images of the first to third infrared lights, blue light, green light, and red light in the main scanning direction D1.

<Structure of Banknote Recognition Unit>

Figure 7:
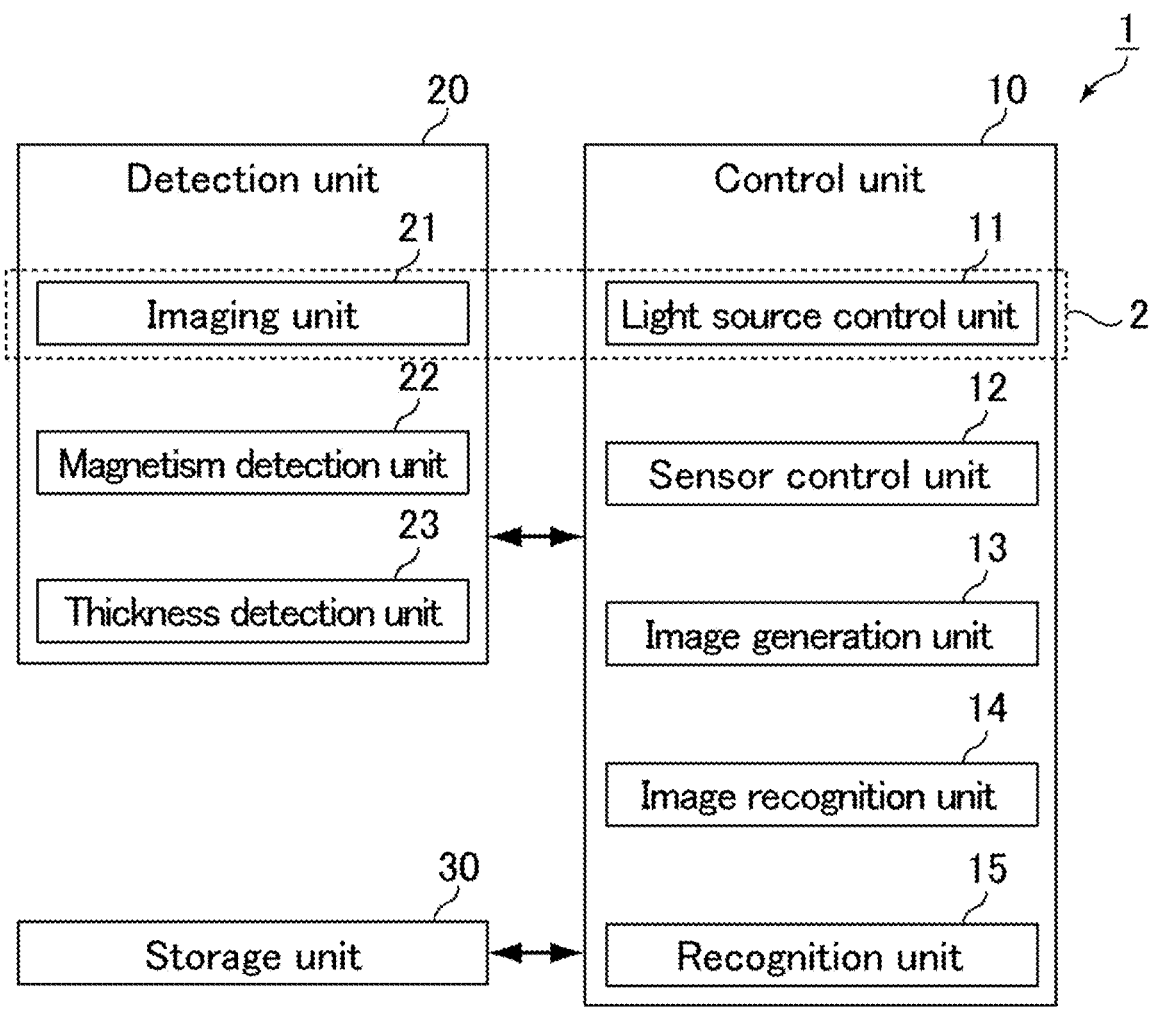
FIG. 7 is a block diagram of a structure of the banknote recognition unit according to Embodiment 2.

Next, a structure of the banknote recognition unit of the present embodiment is described with reference to FIG. 7. As shown in FIG. 7, a banknote recognition unit 1 of the present embodiment includes a control unit (controller) 10, a detection unit 20, and a storage unit 30.

The control unit 10 includes, for example, programs for achieving a variety of processing stored in the storage unit 30, a central processing unit (CPU) that executes the programs, and a variety of hardware controlled by the CPU (e.g., a field programmable gate array (FPGA)). The control unit 10 controls the components of the banknote recognition unit 1 based on signals output from the components of the banknote recognition unit 1 and control signals from the control unit 10 in accordance with the programs stored in the storage unit 30. The control unit 10 has functions of the light source control unit 11, a sensor control unit 12, an image generation unit 13, an image recognition unit 14, and a recognition unit 15 owing to the programs stored in the storage unit 30.

In addition to the aforementioned imaging unit 21, the detection unit 20 includes a magnetism detection unit 22 and a thickness detection unit 23 along the transport path for banknotes. As described above, the imaging unit 21 images a banknote and outputs an image signal (image data). The magnetism detection unit 22 includes a magnetism sensor (not shown) to detect the magnetism, and detects the magnetism of magnetic ink printed on a banknote and a security thread, for example, with the magnetism sensor. The magnetism sensor is a magnetism line sensor of a plurality of magnetism detection elements arranged in line. The thickness detection unit 23 includes a thickness detection sensor (not shown) to measure the thickness of a banknote, and detects tape, double feeding, or other factors with the thickness detection sensor. The thickness detection sensor detects the amount of displacement of rollers facing each other across the transport path during passing of a banknote with sensors provided for the respective rollers. In the present embodiment, the light source control unit 11 of the control unit 10 and the imaging unit 21 of the detection unit 20 define the optical sensor 2 of the present embodiment.

The storage unit 30 includes a nonvolatile storage unit such as a semiconductor memory or a hard disk, and stores a variety of programs and a variety of data for controlling the banknote recognition unit 1. The storage unit 30 stores imaging parameters such as the wavelength bands of irradiation lights emitted from the light sources 111, 121, and 124 during one cycle of imaging by the imaging unit 21; the timings of turning on and off the light sources 111, 121, and 124; the values of the forward currents applied to the LED elements of the light sources 111, 121, and 124; and the timings of reading the signals from each of the upper unit 110 and the lower unit 120.

The term "one cycle of imaging" refers to an imaging pattern with predetermined parameters such as the wavelength bands of irradiation lights emitted from the light sources 111, 121, and 124, the timings of turning on and off the light sources 111, 121, and 124, and the timings of reading the signals. Continuous and repeated execution of one cycle of imaging as one period can provide an image of the entire banknote.

The light source control unit 11 executes dynamic lighting control of the light sources 111, 121, and 124 to achieve acquisition of individual images of a banknote using the respective light sources 111, 121, and 124. Specifically, the light source control unit 11 controls turning on and off of each of the light sources 111, 121, and 124 based on the timings set in the imaging parameters. This control is executed using a mechanical clock that varies depending on the speed of transporting a banknote and a system clock that is output at a constant frequency regardless of the speed of transporting a banknote.

The light source control unit 11 causes the light sources 111 and 124 for the light-receiving unit 113 to emit blue light serving as the first irradiation light and infrared lights (first to third infrared lights) serving as the second irradiation light at different timings. Similarly, the light source control unit 11 causes the light sources 121 for the light-receiving unit 123 to emit blue light and infrared lights (first to third infrared lights) at different timings. Thereby, the blue light-receiving elements 1318 can receive blue light and infrared lights (first to third infrared lights) at different timings.

The phrase "emit a plurality of lights (e.g., infrared light and blue light) at different timings" means that the periods of emitting the respective lights (the period from start of emission to end of emission) do not overlap each other.

The light source control unit 11 causes the light sources 111 and 124 for the light-receiving unit 113 to emit green light serving as the third irradiation light and at least one of blue light serving as the first irradiation light or infrared light serving as the second irradiation light at the same timing. Similarly, the light source control unit 11 causes the light sources 121 for the light-receiving unit 123 to emit green light and at least one of infrared light or blue light (in the present embodiment, blue light) at the same timing. In either case, the green light-receiving elements 131G can receive green light and simultaneously the blue light-receiving element 131B can receive blue light or infrared light (one of first to third infrared lights).

The light source control unit 11 causes the light sources 111 and 124 for the light-receiving unit 113 to emit red light serving as the fourth irradiation light and at least one of blue light serving as the first irradiation light or infrared light serving as the second irradiation light at the same timing. Similarly, the light source control unit 11 causes the light sources 121 for the light-receiving unit 123 to emit red light and at least one of infrared light or blue light (in the present embodiment, blue light) at the same timing. In either case, the red light-receiving element 131R can receive red light and simultaneously the blue light-receiving element 131B can receive infrared light (one of first to third infrared lights) or blue light.

The phrase "emit a certain light (e.g., infrared light and blue light) and a different light (e.g., at least one of infrared light or blue light) at the same timing" means that the periods of emitting the respective lights (the period from start of emission to end of emission) at least partially overlap each other. The timings of start and end of emission of these lights may or may not be the same as each other (including the case where they are substantially the same as each other).

The sensor control unit 12 controls the timings of reading image signals from each of the upper unit 110 and the lower unit 120 based on the timings set in the imaging parameters, and reads the image signals from each of the upper unit 110 and the lower unit 120 in synchronism with the timings of turning on and off the respective light sources 111, 121, and 124. This control is executed using the mechanical clock and the system clock. The sensor control unit 12 then sequentially stores the read image signals, i.e., line data, in the ring buffer (line memory) of the storage unit 30.

The line data herein means data based on image signals acquired by a single imaging using each of the upper unit 110 and the lower unit 120, and corresponds to data of one line in the lateral direction (direction perpendicular to the transport direction for banknotes; Y direction) of the image to be acquired.

The image generation unit 13 has a function of generating an image based on a variety of banknote-related signals acquired from the detection unit 20. Specifically, the image generation unit 13 first decomposes the data (image signals) stored in the ring buffer into data pieces for the respective conditions of light emission and light reception. The image generation unit 13 then executes correction processing such as cutoff of dark output, gain adjustment, and correction of bright output level in accordance with the features of the respective decomposed data pieces to generate a variety of image data of the banknote, and store them in the storage unit 30.

The image recognition unit 14 recognizes the image data generated by the image generation unit 13. In other words, the image recognition unit 14 analyzes the image data and extracts the features to recognize the target. Specifically, for example, in the case of a banknote having its serial number printed thereon, the image recognition unit 14 recognizes the serial number portion of the image data as characters and recognizes the serial number of the banknote. Additionally or alternatively, the image recognition unit 14 may recognize the face of a person printed on a banknote. Also, the image recognition unit 14 stores the recognition results in the storage unit 30.

The recognition unit 15 utilizes a variety of banknote-related signals acquired from the detection unit 20 to execute recognition processing. The recognition unit 15 recognizes at least the denomination and authenticity of a banknote. The recognition unit 15 may have a function of determining the fitness of a banknote. In this case, the recognition unit 15 has a function of detecting dirt, folding, tear, or the like of a banknote and detecting tape or other item attached to a banknote based on the thickness of the banknote and thereby determining whether the banknote is a fit note that is reusable in the market or an unfit note that is not suitable for market distribution.

In the case of using an image of a banknote captured by the imaging unit 21 to recognize the denomination, authenticity, fitness, and the like, the recognition unit 15 utilizes the image data generated by the image generation unit 13 or the recognition results acquired by the image recognition unit 14. For example, the authenticity may be determined by checking the presence or absence of a fluorescent reaction or by matching an infrared image obtained by emitting light from a light source with a template.

<Method of Controlling Light Sources and Timings of Collecting Data by Light-Receiving Units>

Figure 8:
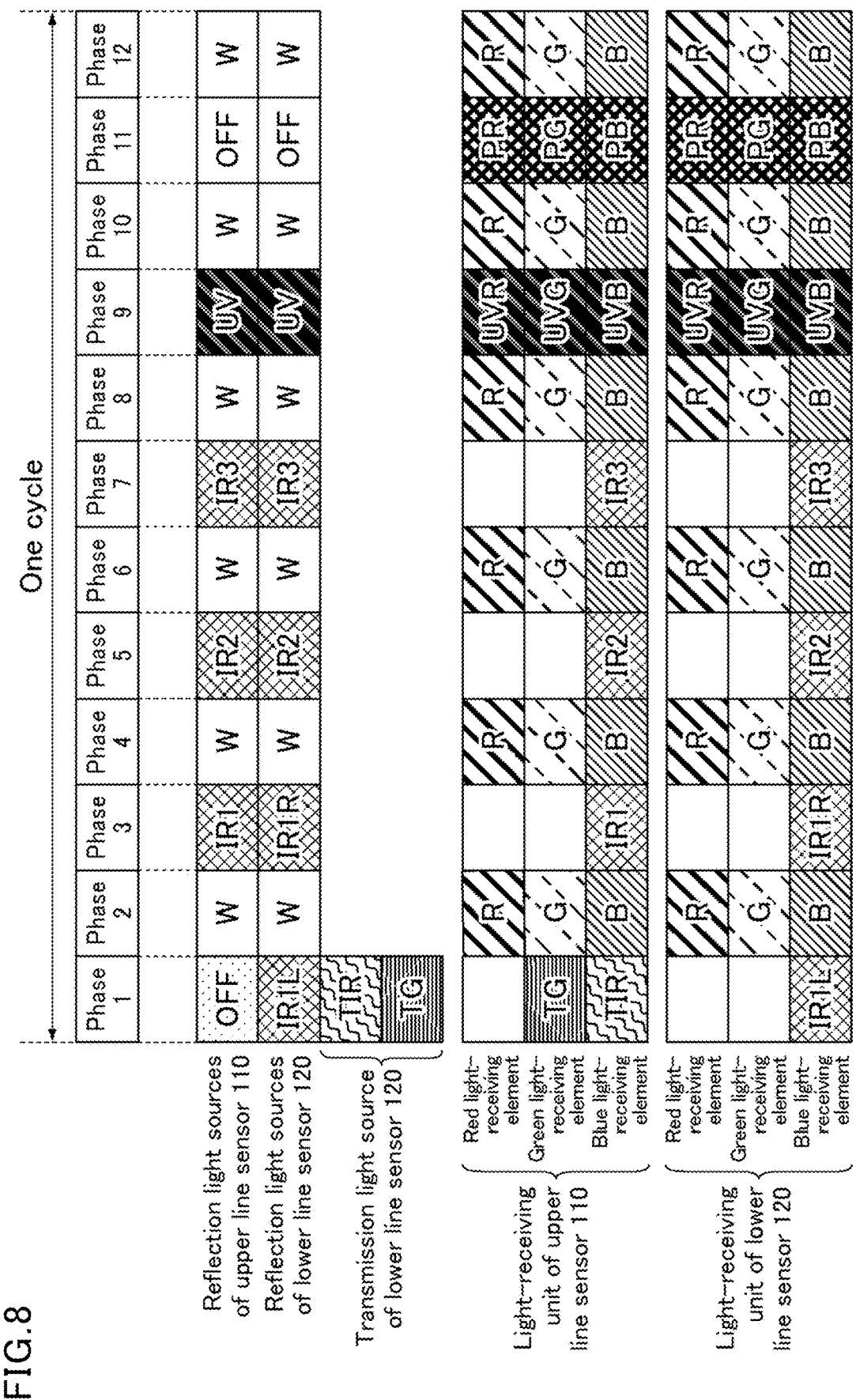
FIG. 8 is a timing chart of timings of turning on the light sources and timings of light reception by the light-receiving units in the banknote recognition unit of Embodiment 2.
Figure 9:
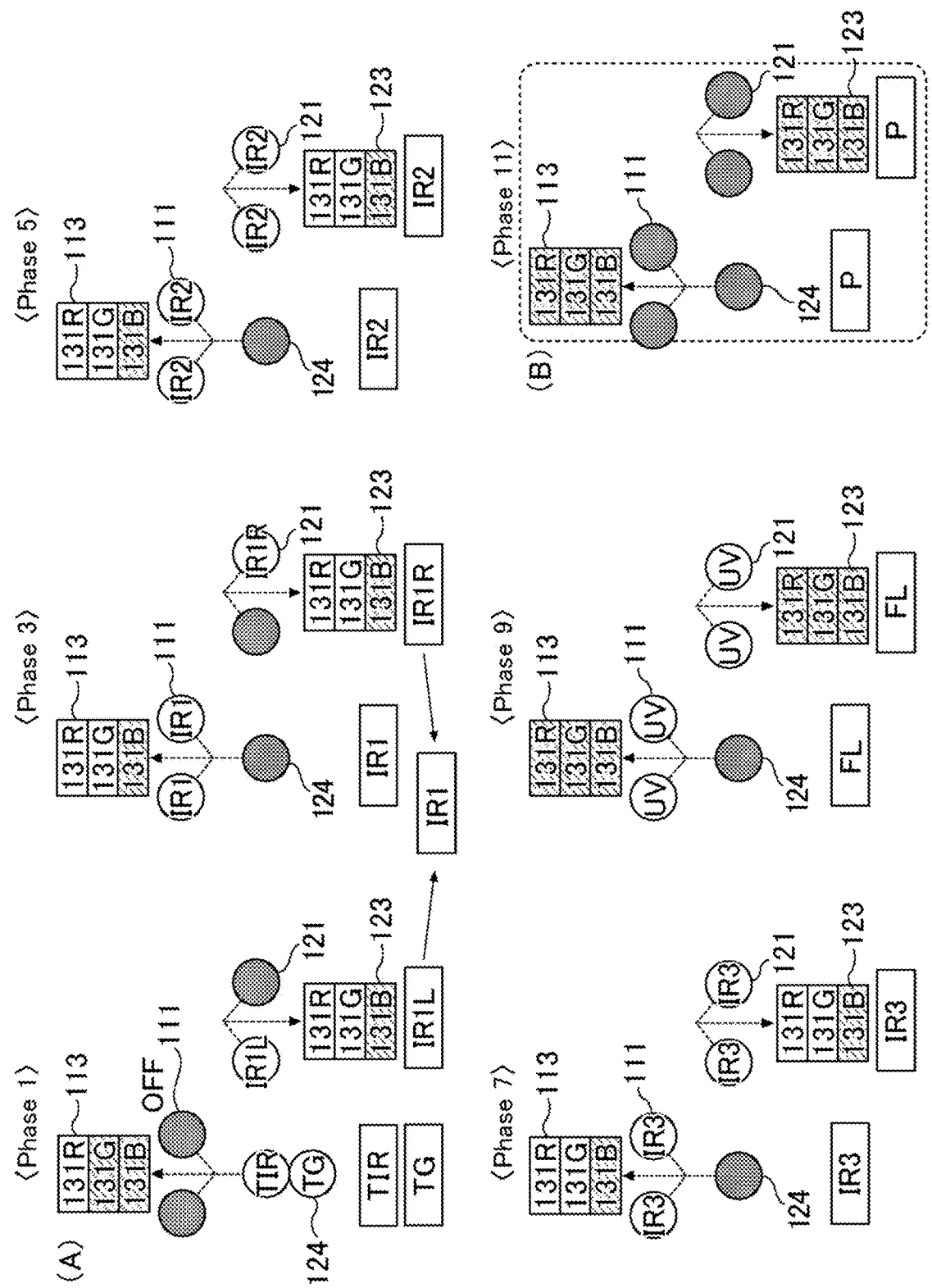
FIG. 9 is an explanatory diagram of the turning on of the light sources and the light reception by the light-receiving units in the odd-numbered phases of the timing chart shown in FIG. 8.
Figure 10:
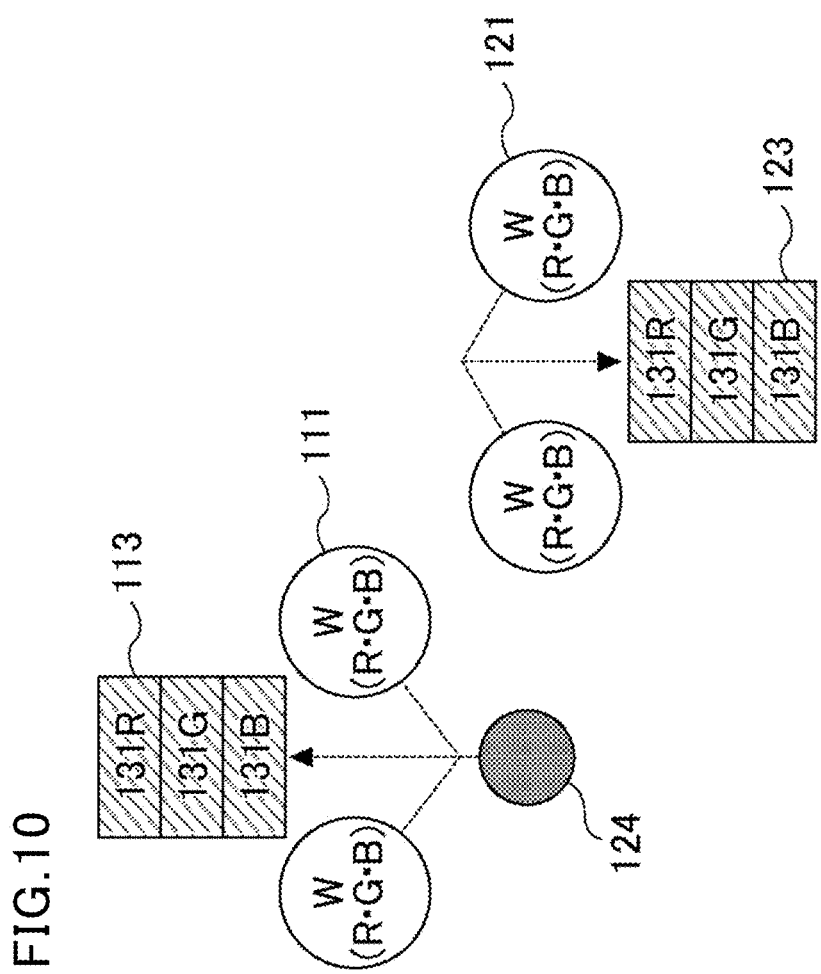
FIG. 10 is an explanatory diagram of the turning on of the light sources and the light reception by the light-receiving units in the even-numbered phases of the timing chart shown in FIG. 8.

With reference to FIG. 8 to FIG. 10, the following specifically describes the control of (the timings of turning on) the light sources 111, 121, and 124 by the light source control unit 11 and the timings of light reception by the light-receiving units 113 and 123. FIG. 8 shows the details and timings of turning on the light sources and receiving the lights. In FIG. 9 and FIG. 10, the light sources that are turned off are hatched in gray.

As shown in FIG. 8, the upper unit 110 and the lower unit 120 undergo 12 phases, i.e., Phases 1 to 12, which are taken as one cycle, and repeat this cycle, thereby acquiring image data corresponding to the entire surfaces of a banknote.

As shown in FIG. 8 and FIG. 9, in Phase 1, the transmission light source 124 emits infrared light (TIR) as the second irradiation light and green light (TG) as the third irradiation light simultaneously to the side B of a banknote, and the light-receiving unit 113 receives the second incident light (infrared light (TIR)), which is light generated from the second irradiation light while the second irradiation light is applied to the banknote, and a third incident light (green light (TG)), which is light generated from the third irradiation light while the third irradiation light is applied to the banknote. More specifically, the blue light-receiving element 131B detects the second incident light (infrared light (TIR)), which is light generated by transmission of the second irradiation light through the banknote, and the green light-receiving elements 131G detect the third incident light (green light (TG)), which is light generated by transmission of the third irradiation light through the banknote. At this time, the green light (TG) may have a peak wavelength of not shorter than 560 nm and not longer than 600 nm so that the green light (TG) is not detected by the blue light-receiving element 131B. Also, in Phase 1, the reflection light source 121 upstream of the transport direction for banknotes emits the first infrared light (IR1L) to the side B of the banknote and the light-receiving unit 123 receives, in other words, the blue light-receiving element 131B detects, the first infrared light (IR1L) reflected on the side B of the banknote.

As shown in FIG. 8 and FIG. 10, in Phase 2, the reflection light sources 111 emit white light (W) including blue light (B) serving as the first irradiation light, green light (G) serving as the third irradiation light, and red light (R) serving as the fourth irradiation light to the side A of the banknote, and the light-receiving unit 113 receives the first incident light (blue light (B)), which is light generated from the first irradiation light while the first irradiation light is applied to the banknote, the third incident light (green light (G)), which is light generated from the third irradiation light while the third irradiation light is applied to the banknote, and the fourth incident light (red light (R)), which is light generated from the fourth irradiation light. More specifically, the blue light-receiving element 131B, the green light-receiving elements 131G, and the red light-receiving element 131R respectively detect the first incident light (blue light (B)), the third incident light (green light (G)), and the fourth incident light (red light (R)), which are respectively lights generated by reflection of the first irradiation light, the third irradiation light, and the fourth irradiation light on the side A of the banknote. Similarly, in Phase 2, the reflection light sources 121 emit white light (W) including blue light (B) serving as the first irradiation light, green light (G) serving as the third irradiation light, and red light (R) serving as the fourth irradiation light to the side B of the banknote, and the light-receiving unit 123 receives the lights emitted to and reflected on the side B of the banknote. In other words, the blue light-receiving element 131B, the green light-receiving elements 131G, and the red light-receiving element 131R respectively detect the blue light (B), the green light (G), and the red light (R), which are respectively the first incident light, the third incident light, and the fourth incident light reflected on the side B of the banknote. Phases 4, 6, 8, 10, and 12 are the same as Phase 2 and are therefore not further elaborated upon below.

As shown in FIG. 8 and FIG. 9, in Phase 3, the reflection light sources 111 emit the first infrared light (IR1) as the second irradiation light to the side A of the banknote, and the light-receiving unit 113 receives the second incident light (first infrared light (IR1)), which is light generated from the second irradiation light while the second irradiation light is applied to the banknote. More specifically, the blue light-receiving element 131B detects the second incident light (first infrared light (IR1)), which is light generated by reflection of the second irradiation light on the side A of the banknote. Similarly, in Phase 3, the reflection light source 121 downstream of the transport direction for banknotes emits the first infrared light (IR1R) to the side B of the banknote and the light-receiving unit 123 receives, in other words, the blue light-receiving element 131B detects, the first infrared light (IR1R) reflected on the side B of the banknote.

In the present embodiment, the output value of the image signal by the first infrared light (IR1L) emitted from the upstream of the transport direction for banknotes and the output value of the image signal by the first infrared light (IR1R) emitted from the downstream of the transport direction for banknotes are added to form a total signal and, based on this total signal, a reflection image by the first infrared lights of the side B of the banknote is generated. The image signal by the first infrared light (IR1L) emitted from the upstream and the image signal by the first infrared light (IR1R) emitted from the downstream are acquired for detection of wrinkles on the banknote.

As shown in FIG. 8 and FIG. 9, in Phase 5, the reflection light sources 111 emit the second infrared light (IR2) as the second irradiation light to the side A of the banknote, and the light-receiving unit 113 receives the second incident light (second infrared light (IR2)), which is light generated from the second irradiation light while the second irradiation light is applied to the banknote. More specifically, the blue light-receiving element 131B detects the second incident light (second infrared light (IR2)), which is light generated by reflection of the second irradiation light on the side A of the banknote. Similarly, in Phase 5, the reflection light sources 121 emit the second infrared light (IR2) to the side B of the banknote and the light-receiving unit 123 receives, in other words, the blue light-receiving element 131B detects, the second infrared light (IR2) reflected on the side B of the banknote.

As shown in FIG. 8 and FIG. 9, in Phase 7, the reflection light sources 111 emit the third infrared light (IR3) as the second irradiation light to the side A of the banknote, and the light-receiving unit 113 receives the second incident light (third infrared light (IR3)), which is light generated from the second irradiation light while the second irradiation light is applied to the banknote. More specifically, the blue light-receiving element 131B detects the second incident light (third infrared light (IR3)), which is light generated by reflection of the second irradiation light on the side A of the banknote. Similarly, in Phase 7, the reflection light sources 121 emit the third infrared light (IR3) to the side B of the banknote and the light-receiving unit 123 receives, in other words, the blue light-receiving element 131B detects, the third infrared light (IR3) reflected on the side B of the banknote.

As shown in FIG. 8 and FIG. 9, in Phase 9, the reflection light sources 111 emit ultraviolet light (UV) to the side A of the banknote, and the light-receiving unit 113 receives the fluorescence (FL), which is light travelling from the side A of the banknote and generated from the ultraviolet light while the ultraviolet light is applied to the banknote. In other words, the blue light-receiving element 131B, the green light-receiving elements 131G, and the red light-receiving element 131R respectively receive the blue component (UVB) of the fluorescence as the first incident light, the green component (UVG) of the fluorescence as the third incident light, and the red component (UVR) of the fluorescence as the fourth incident light, which are emitted from the side A of the banknote. Similarly, in Phase 9, the reflection light sources 121 emit ultraviolet light (UV) to the side B of the banknote, and the light-receiving unit 123 receives the fluorescence (FL) travelling from the side B of the banknote. In other words, the blue light-receiving element 131B, the green light-receiving elements 131G, and the red light-receiving element 131R respectively detect the blue component (UVB), the green component (UVG), and the red component (UVR) of the fluorescence emitted from the side B of the banknote.

As shown in FIG. 8 and FIG. 9, in Phase 11, none of the light sources 111, 121, and 124 are turned on, and the light-receiving unit 113 receives the phosphorescence (P), which is light travelling from the side A of the banknote and generated from the ultraviolet light emitted in Phase 9. In other words, the blue light-receiving element 131B, the green light-receiving elements 131G, and the red light-receiving element 131R respectively detect the blue component (PB) of the phosphorescence as the first incident light, the green component (PG) of the phosphorescence as the third incident light, and the red component (PR) of the phosphorescence as the fourth incident light, which are emitted from the side A of the banknote. Similarly, in Phase 11, the light-receiving unit 123 receives the phosphorescence (P) travelling from the side B of the banknote. In other words, the blue light-receiving element 131B, the green light-receiving elements 131G, and the red light-receiving element 131R respectively detect the blue component (PB), the green component (PG), and the red component (PR) of the phosphorescence emitted from the side B of the banknote.

The banknote recognition unit 1 may be further provided with phosphorescence detection without any change in duration of one cycle. Specifically, in Phase 1 (see (A) in FIG. 9), the banknote recognition unit 1 simultaneously emits infrared light (TIR) and green light (TG) from the transmission light source 124 to a banknote and the blue light-receiving element 131B and the green light-receiving elements 131G simultaneously detect the respective lights transmitted through the banknote. In other words, the transmitted green light (TG) and the transmitted infrared light (TIR) are detected in one phase. Thus, the number of phases of the light-receiving unit 113 for detecting the transmitted green light (TG) and the transmitted infrared light (TIR) is reduced by one compared to the case of detecting these lights in different phases. This can resultantly form one vacant phase for the light-receiving unit 113. Further, the banknote recognition device 1 generates a reflection image of the side B of the banknote by the first infrared lights from the total signal formed by adding the output value of the image signal by the first infrared light (IR1R) and the output value of the image signal by the first infrared light (IR1L), which are acquired for detection of wrinkles on the banknote. Thus, the number of phases of the light-receiving unit 123 is reduced by one compared to the case of emitting the first infrared light (IR1) separately from the two reflection light sources 121 for a reflection image of the side B of the banknote by the first infrared light and detecting the reflected light. This can resultantly form one vacant phase for the light-receiving unit 123. Thereby, in the present embodiment, one vacant phase is formed for each of the light-receiving units 113 and 123 and is used to detect the phosphorescence (see (B) in FIG. 9). Thus, phosphorescence detection can be added without any change in duration of one cycle.

Also, in the present embodiment, the light sources 111 and 124 for the light light-receiving unit 113 emit infrared light, blue light, green light, and red light to a light-receiving unit 113 side of a banknote while emit green light to an opposite side of the target. This structure enables acquisition of reflection images generated by each of the red light, green light, blue light, and infrared light and acquisition of a transmission image generated by the green light.

Also, in the present embodiment, the light source control unit 11 causes the light source 124 to emit infrared light to the opposite side of a banknote and green light to the opposite side of the banknote at the same timing. The blue light-receiving element 131B receives the infrared light transmitted through the banknote while the green light-receiving elements 131G receive the green light transmitted through the banknote. This structure allows the light-receiving unit 113 to receive the infrared light and the green light transmitted through the banknote at the same timing, which can shorten the period of time required for receiving the transmitted infrared light and the transmitted green light compared to the case of receiving such transmitted infrared light and transmitted green light at different timings.

In the present embodiment, the blue light and the infrared light received by the light-receiving units are defined respectively as the first incident light and the second incident light. Still, a combination of the first incident light and the second incident light is any combination of infrared light and blue light. Infrared light may be defined as the first incident light and blue light may be defined as the second incident light. Also, in the present embodiment, the green light and the red light received by the light-receiving units are defined respectively as the third incident light and the fourth incident light. Still, a combination of the third incident light and the fourth incident light is any combination of red light and green light. The third incident light may be red light and the fourth incident light may be green light. In the case where the third incident light is red light and the fourth incident light is green light, the red light-receiving element 131R corresponds to the second light-receiving element and the green light-receiving elements 131G each correspond to the third light-receiving element.

Embodiment 3

Figure 12:
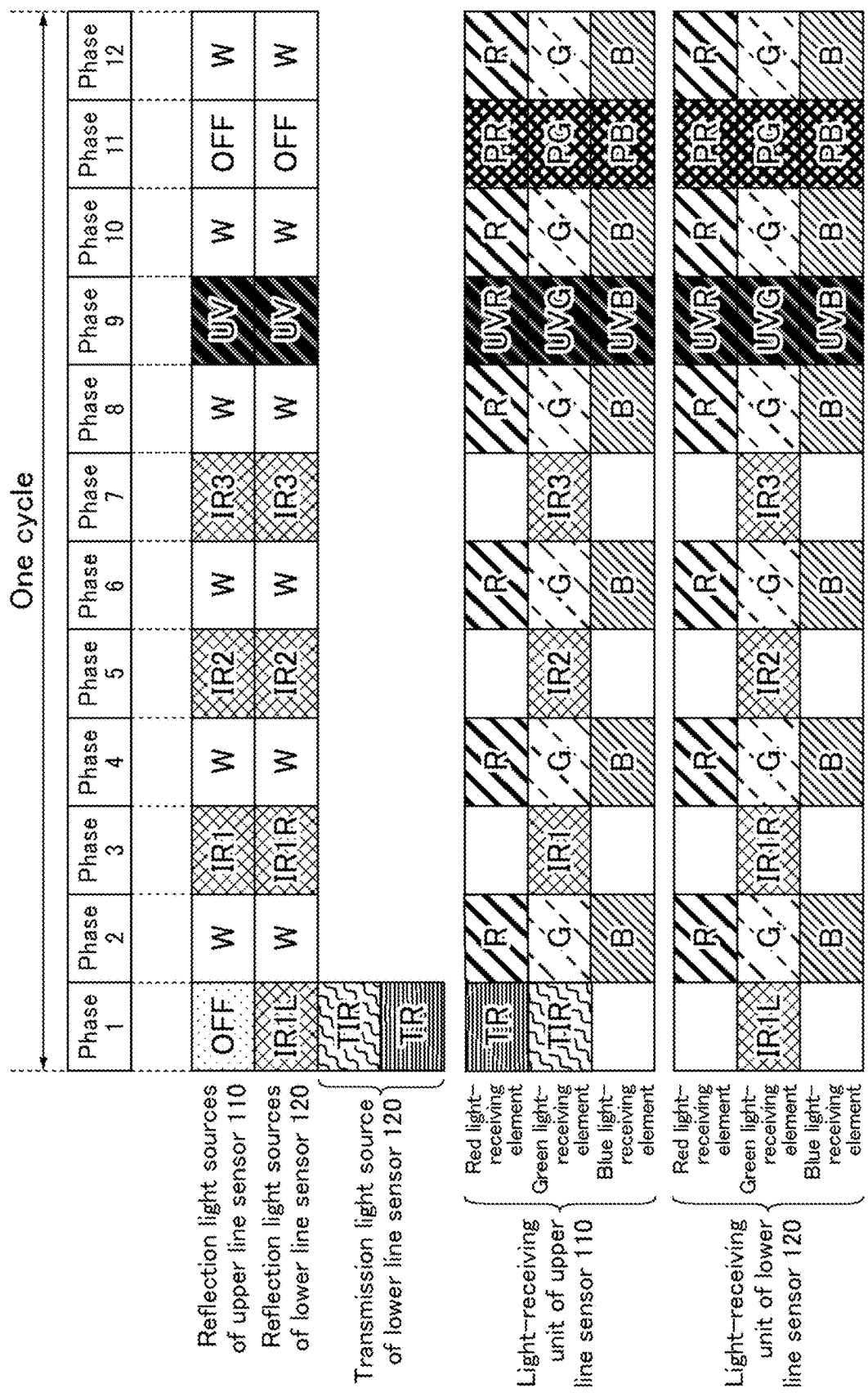
FIG. 12 is a timing chart of timings of turning on the light sources and timings of light reception by the light-receiving units in the banknote recognition unit of Embodiment 3.
Figure 13:
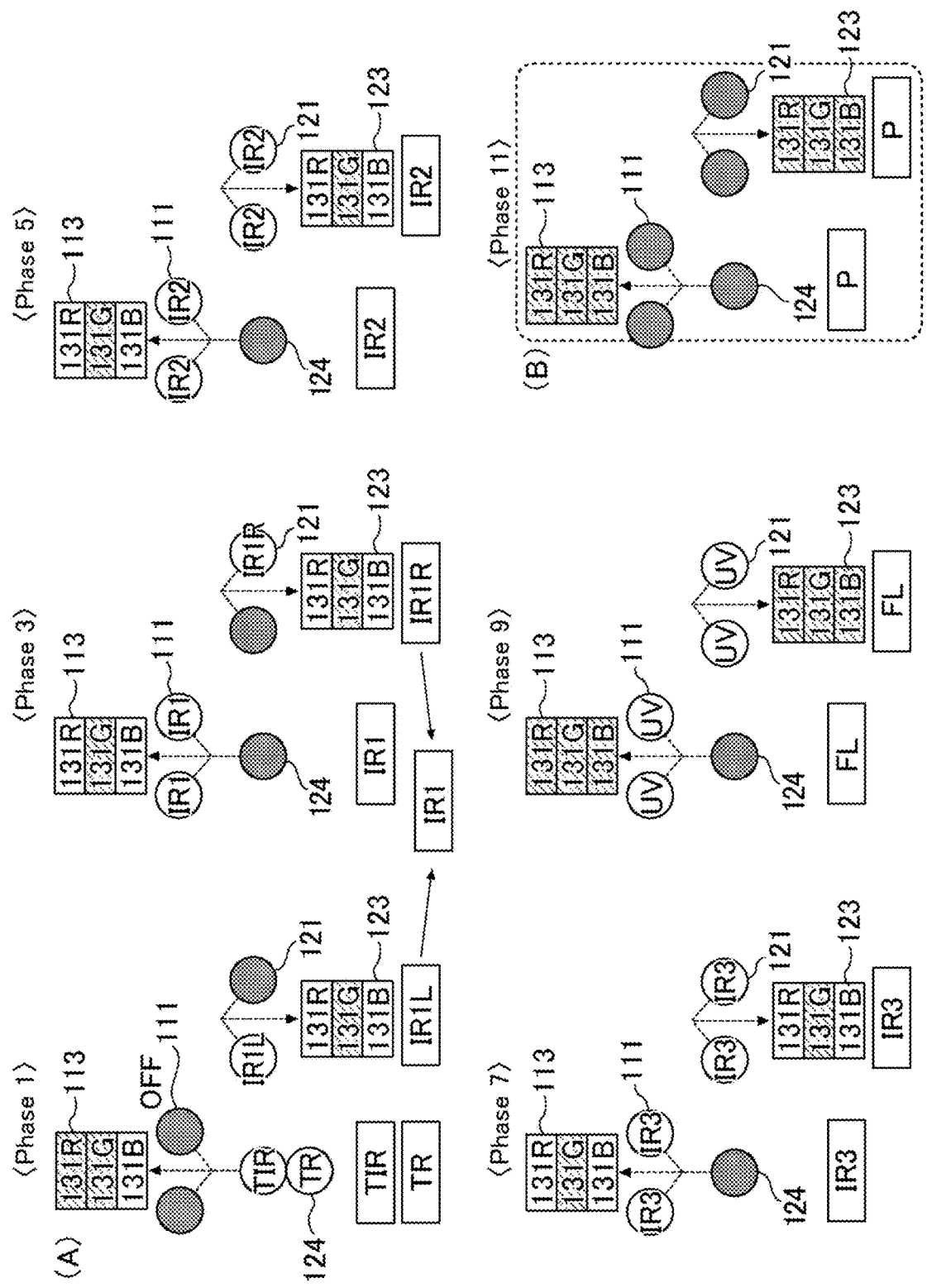
FIG. 13 is an explanatory diagram of the turning on of the light sources and the light reception by the light-receiving units in the odd-numbered phases of the timing chart shown in FIG. 12.

In the present embodiment, the features unique to the present embodiment will be mainly described while the contents overlapping those in the above embodiments are not elaborated upon here. The banknote handling device of the present embodiment has a structure similar to that of Embodiment 2 except that the light-receiving unit (light receiver) has the structure shown in FIG. 11 and the details and the timings of turning on the light sources and the light-receiving units are as shown in FIG. 12 and FIG. 13. In the present embodiment, green light received by the light-receiving units corresponds to the first incident light and infrared light received by the light-receiving units corresponds to the second incident light. Also, blue light received by the light-receiving units corresponds to the third incident light and red light received by the light-receiving units corresponds to the fourth incident light.

Figure 11:
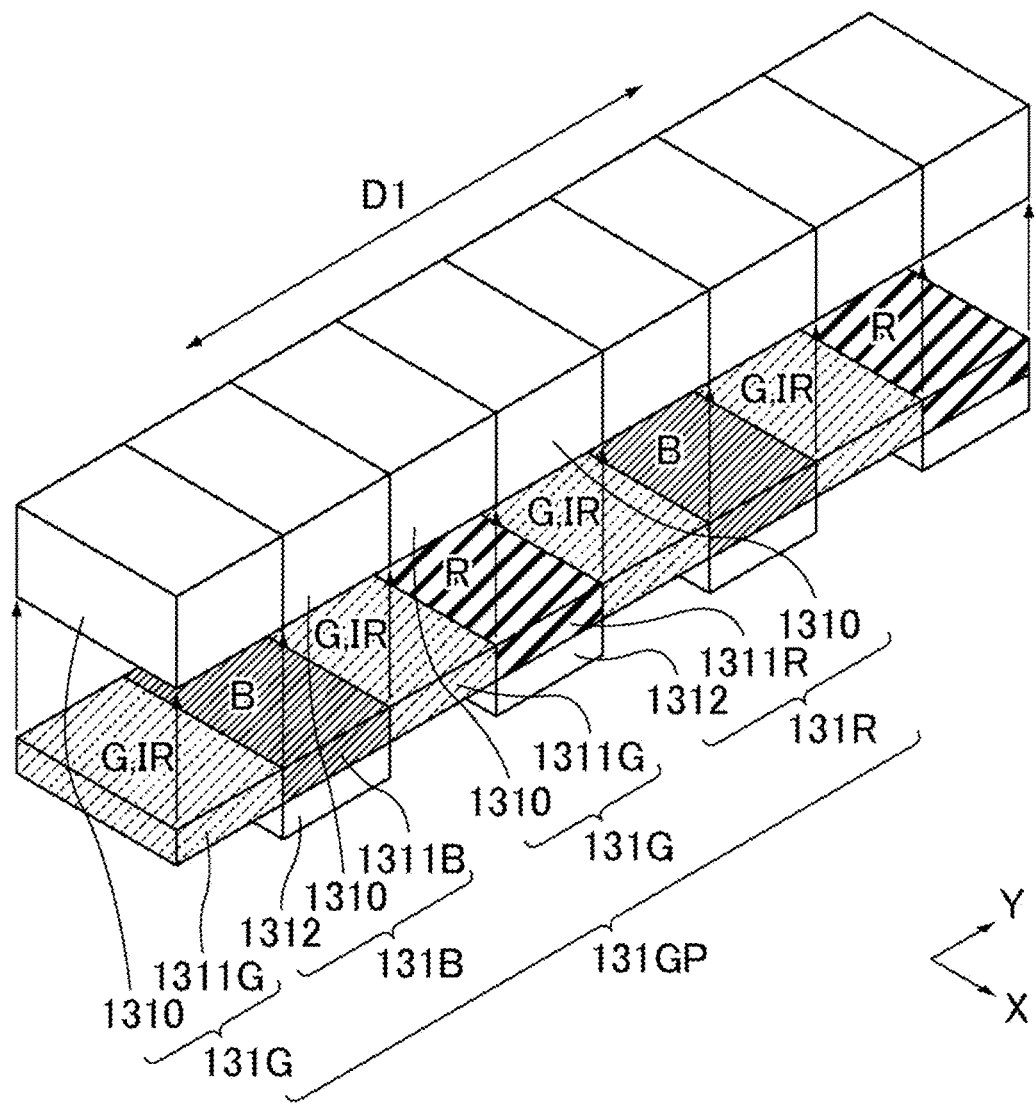
FIG. 11 is an enlarged schematic perspective view of a light-receiving unit in a banknote recognition unit according to Embodiment 3.

As shown in FIG. 11, each pixel in the present embodiment includes two green light-receiving elements 131G that receive infrared light and green light and that receive neither red light nor blue light; one red light-receiving element 131R that receives red light and that receives none of infrared light, green light, and blue light; and one blue light-receiving element 131B that receives blue light and that receives none of infrared light, red light, and green light. In the present embodiment, the green light-receiving elements 131G each correspond to the first light-receiving element, the blue light-receiving element 131B corresponds to the second light-receiving element, and the red light-receiving element 131R corresponds to the third light-receiving element.

As shown in FIG. 11, each green light-receiving element 131G includes a photodetector 1310 and a green color filter 1311G that transmits infrared light and green light and that absorbs red light and blue light. The red light-receiving element 131R includes a photodetector 1310, a red color filter 1311R that transmits infrared light and red light and that absorbs green light and blue light, and an infrared cut-off filter 1312 that cuts off infrared light. The blue light-receiving element 131B includes a photodetector 1310, a blue color filter 1311B that transmits infrared light and blue light and that absorbs red light and green light, and an infrared cut-off filter 1312 that cuts off infrared light. These filters each function as a filter to reduce transmission of the corresponding light through the filter.

As shown in FIG. 12 and FIG. 13, the light source control unit 11 causes the light sources 111 and 124 for the light-receiving unit 113 to emit green light serving as the first irradiation light and infrared lights (first to third infrared lights) serving as the second irradiation light at different timings. Similarly, the light source control unit 11 causes the light sources 121 for the light-receiving unit 123 to emit green light and infrared lights (first to third infrared lights) at different timings. Thereby, the green light-receiving elements 131G can receive green light and infrared lights (first to third infrared lights) at different timings.

The light source control unit 11 causes the light sources 111 and 124 for the light-receiving unit 113 to emit blue light serving as the third irradiation light and at least one of green light serving as the first irradiation light or infrared light serving as the second irradiation light at the same timing. Similarly, the light source control unit 11 causes the light sources 121 for the light-receiving unit 123 to emit blue light and at least one of green light or infrared light at the same timing. In either case, the blue light-receiving element 131B can receive blue light and simultaneously the green light-receiving elements 131G can receive green light or infrared light (one of first to third infrared lights).

The light source control unit 11 causes the light sources 111 and 124 for the light-receiving unit 113 to emit red light serving as the fourth irradiation light and at least one of green light serving as the first irradiation light or infrared light serving as the second irradiation light at the same timing. Similarly, the light source control unit 11 causes the light sources 121 for the light-receiving unit 123 to emit red light and at least one of green light or infrared light at the same timing. In either case, the red light-receiving element 131R can receive red light and simultaneously the green light-receiving elements 131G can receive green light or infrared light (one of first to third infrared lights).

The following specifically describes the control of (the timings of turning on) the light sources 111, 121, and 124 by the light source control unit 11 and the timings of light reception by the light-receiving units 113 and 123. In the present embodiment, Phases 1, 3, 5, and 7, which are different from those in Embodiment 2, will be described while the other phases, which are the same as those in Embodiment 2, are not elaborated upon here.

As shown in FIG. 12 and FIG. 13, in Phase 1, the transmission light source 124 emits infrared light (TIR) as the second irradiation light and red light (TR) as the fourth irradiation light simultaneously to the side B of a banknote, and the light-receiving unit 113 receives the second incident light (infrared light (TIR)), which is light generated from the second irradiation light while the second irradiation light is applied to the banknote, and a fourth incident light (red light (TR)), which is light generated from the fourth irradiation light while the fourth irradiation light is applied to the banknote. More specifically, the green light-receiving elements 131G detect the second incident light (TIR), which is light generated by transmission of the second irradiation light through the banknote, and the red light-receiving element 131R detects the fourth incident light (red light (TR)), which is light generated by transmission of the fourth irradiation light through the banknote. Also, in Phase 1, the reflection light source 121 upstream of the transport direction for banknotes emits the first infrared light (IR1L) to the side B of the banknote and the green light-receiving elements 131G of the light-receiving unit 123 detect the first infrared light (IR1L) reflected on the side B of the banknote.

As shown in FIG. 12 and FIG. 13, in Phases 3, 5, and 7, the reflection light sources 111 emit as the second irradiation light the first infrared light (IR1), the second infrared light (IR2), and the third infrared light (IR3), respectively, to the side A of the banknote, and the light-receiving unit 113 receives the second incident light (first infrared light (IR1), second infrared light (IR2), and third infrared light (IR3)), each of which is light generated from the second irradiation light while the second irradiation light is applied to the banknote. More specifically, in Phases 3, 5, and 7, the green light-receiving elements 131G detect as the second incident light the first infrared light (IR1), the second infrared light (IR2), and the third infrared light (IR3), respectively, each of which is light generated by reflection of the second irradiation light, i.e., the first infrared light (IR1), the second infrared light (IR2), and the third infrared light (IR3), on the side A of the banknote. Similarly, in Phase 3, the reflection light source 121 downstream of the transport direction for banknotes emits the first infrared light (IR1R) to the side B of the banknote and the green light-receiving elements 131G of the light-receiving unit 123 detect the first infrared light (IR1R) reflected on the side B of the banknote. Further, in Phases 5 and 7, the reflection light sources 121 emit respectively the second infrared light (IR2) and the third infrared light (IR3) to the side B of the banknote and the green light-receiving elements 131G of the light-receiving unit 123 detect respectively the second infrared light (IR2) and the third infrared light (IR3) reflected on the side B of the banknote.

Embodiment 4

In the present embodiment, the features unique to the present embodiment will be mainly described while the contents overlapping those in the above embodiments are not elaborated upon here. The banknote handling device of the present embodiment has a structure similar to that in Embodiment 3 except that the lights emitted in Phase 1 are different.

Figure 14:
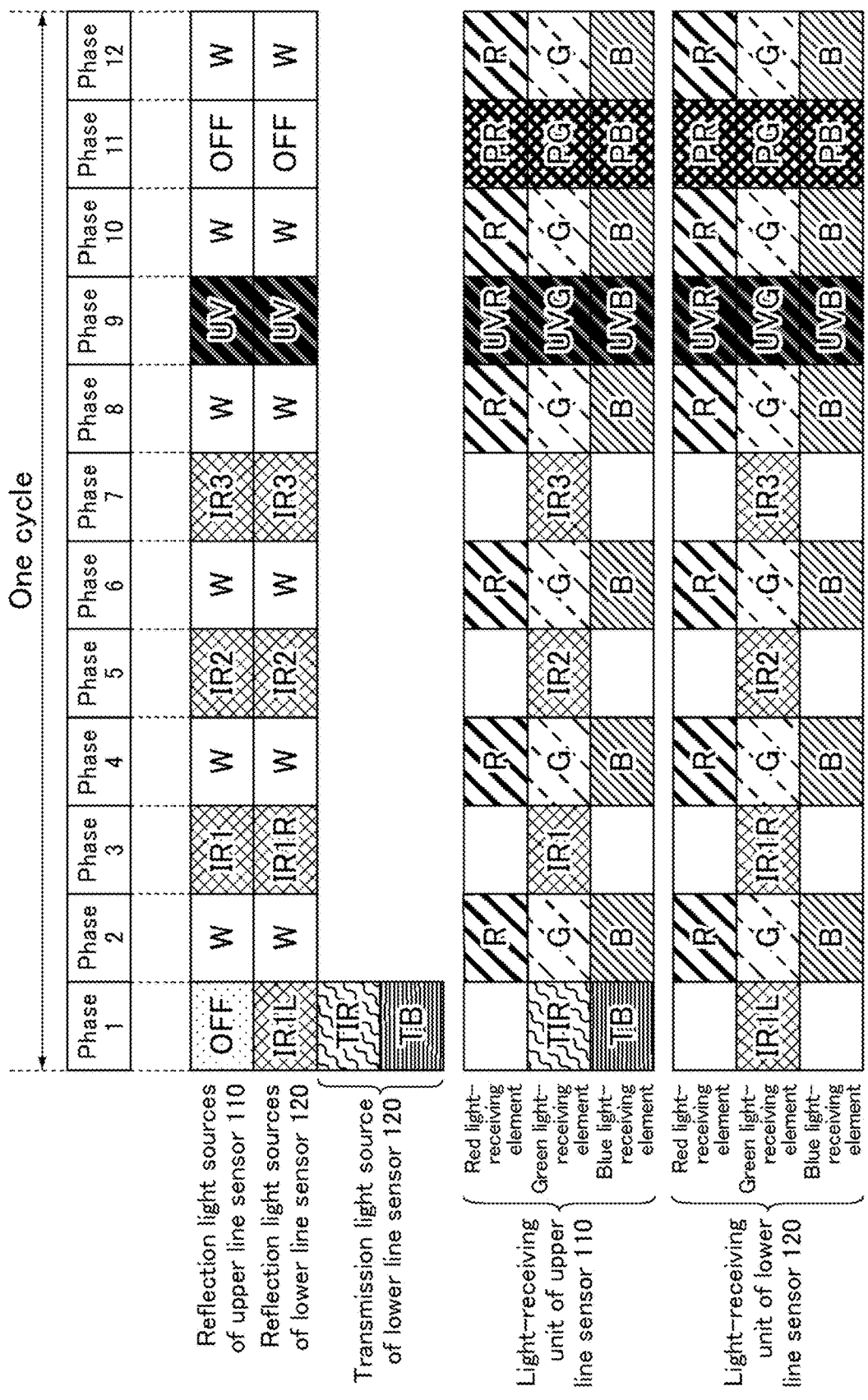
FIG. 14 is a timing chart of timings of turning on the light sources and timings of light reception by the light-receiving units in the banknote recognition unit of Embodiment 4.
Figure 15:
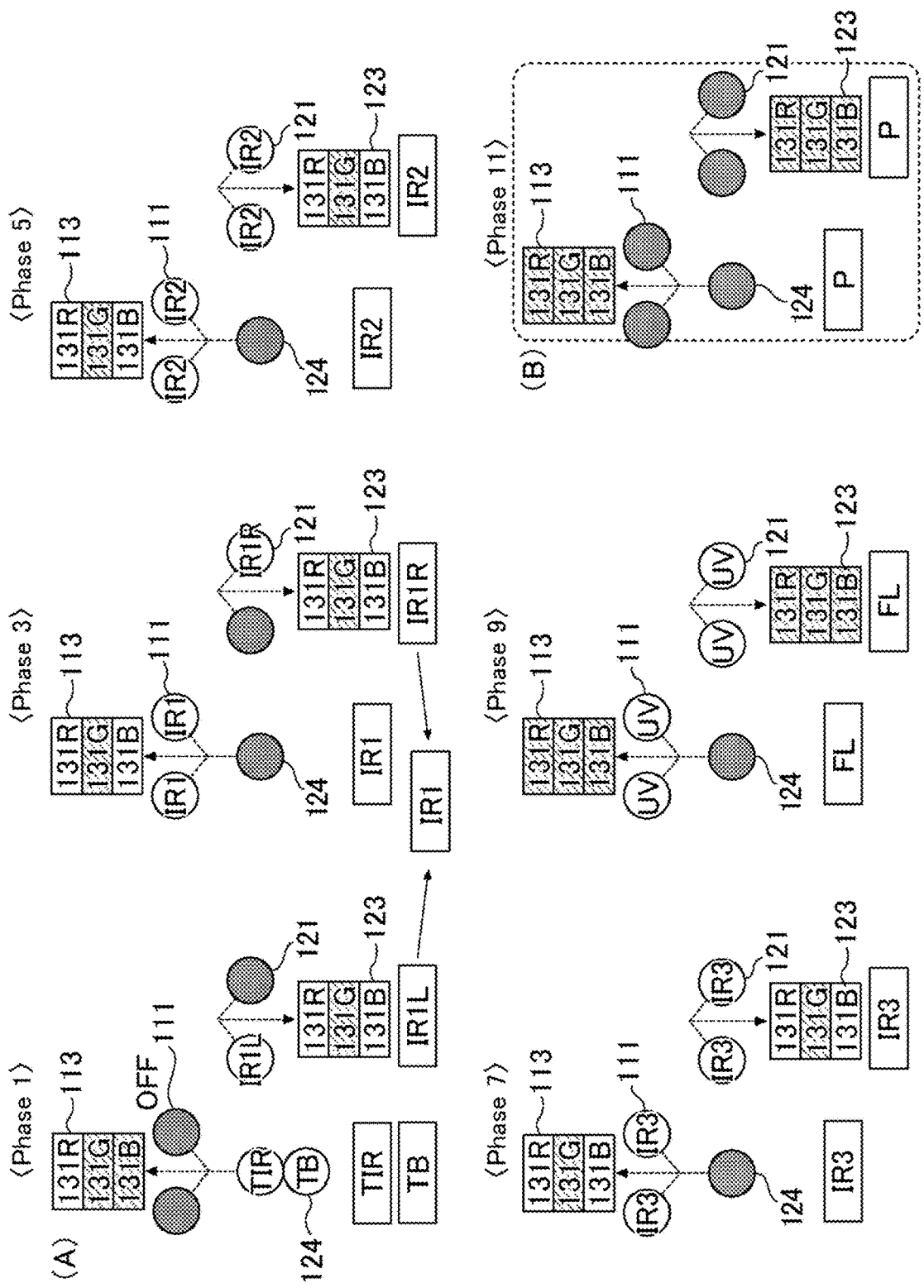
FIG. 15 is an explanatory diagram of the turning on of the light sources and the light reception by the light-receiving units in the odd-numbered phases of the timing chart shown in FIG. 14.

As shown in FIG. 14 and FIG. 15, in Phase 1, the transmission light source 124 emits infrared light (TIR) as the second irradiation light and blue light (TB) as the third irradiation light simultaneously to the side B of a banknote, and the light-receiving unit 113 receives the second incident light (infrared light (TIR)), which is light generated from the second irradiation light while the second irradiation light is applied to the banknote, and the third incident light (blue light (TB)), which is light generated from the third irradiation light while the third irradiation light is applied to the banknote. More specifically, the green light-receiving elements 131G detect the second incident light (TIR), which is light generated by transmission of the second irradiation light through the banknote, and the blue light-receiving element 131B detects the third incident light (blue light (TB)), which is light generated by transmission of the third irradiation light through the banknote.

In Embodiments 3 and 4, the green light and the infrared light received by the light-receiving units are defined respectively as the first incident light and the second incident light. Still, a combination of the first incident light and the second incident light is any combination of infrared light and green light. Infrared light may be defined as the first incident light and green light may be defined as the second incident light. Also, in Embodiments 3 and 4, blue light and red light received by the light-receiving units are defined respectively as the third incident light and the fourth incident light. Still, a combination of the third incident light and the fourth incident light is any combination of red light and blue light. The third incident light may be red light and the fourth incident light may be blue light. In the case where the third incident light is red light and the fourth incident light is blue light, the red light-receiving element 131R corresponds to the second light-receiving element and the blue light-receiving element 131B corresponds to the third light-receiving element.

Embodiment 5

Figure 17:
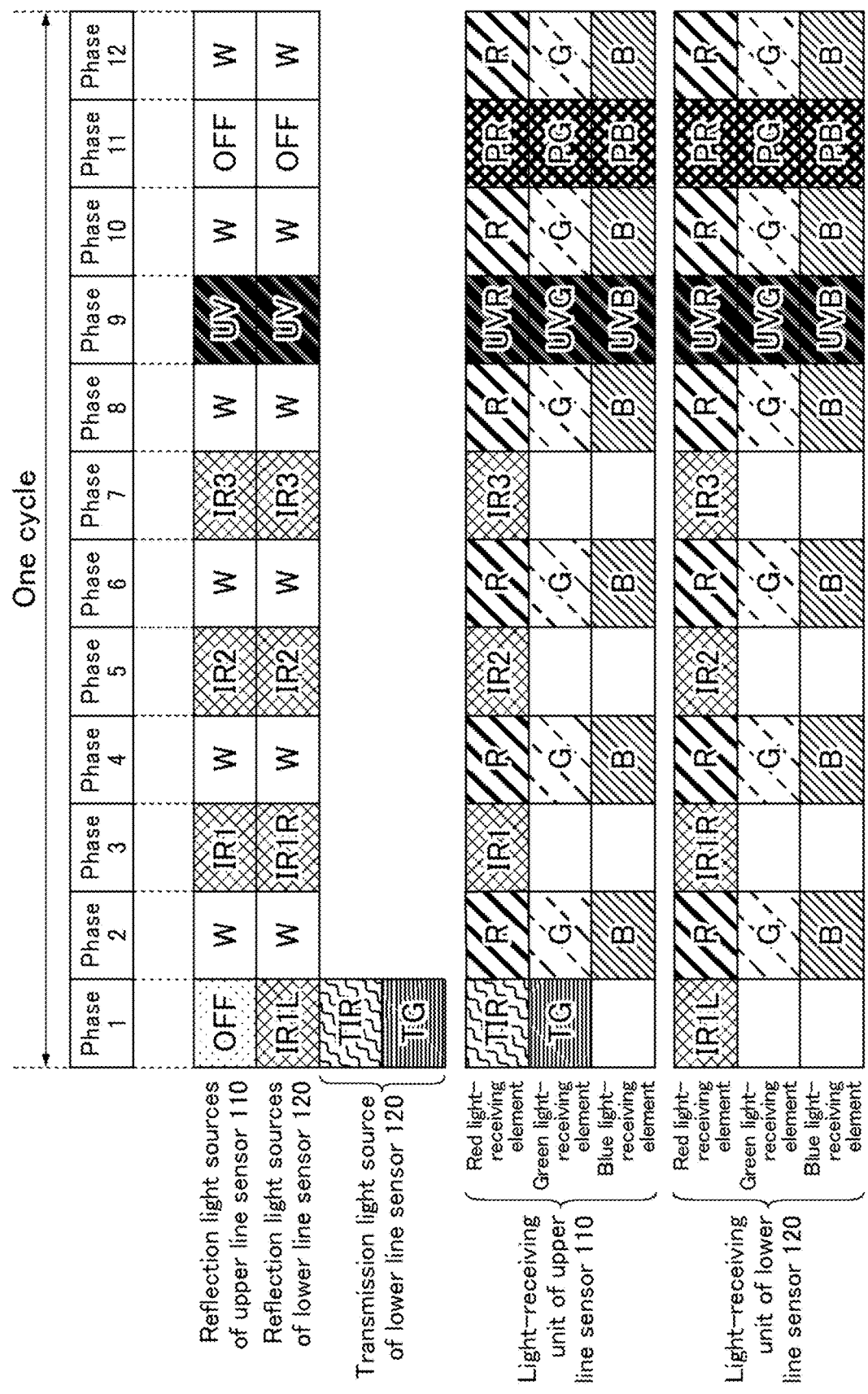
FIG. 17 is a timing chart of timings of turning on the light sources and timings of light reception by the light-receiving units in the banknote recognition unit of Embodiment 5.
Figure 18:
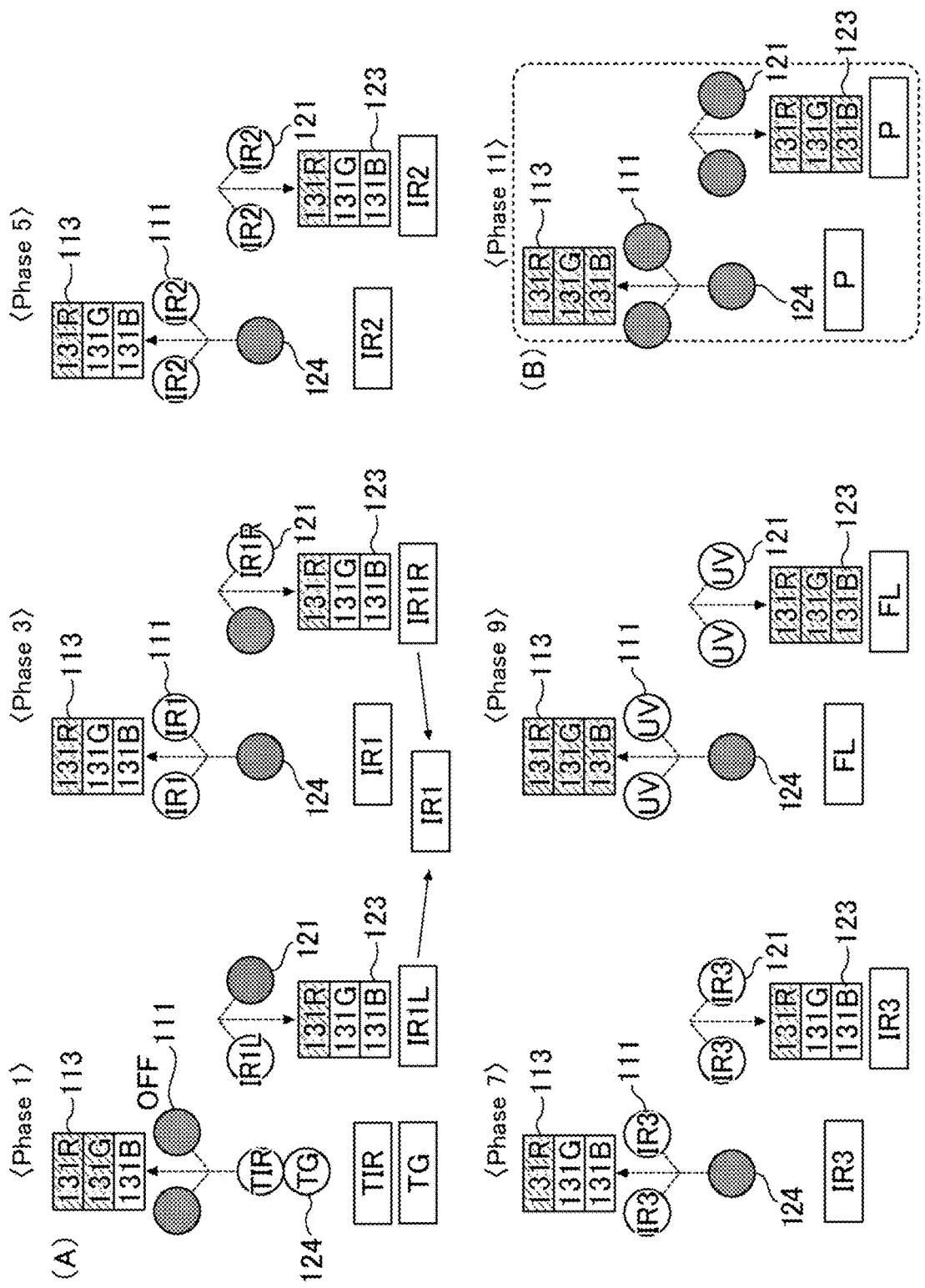
FIG. 18 is an explanatory diagram of the turning on of the light sources and the light reception by the light-receiving units in the odd-numbered phases of the timing chart shown in FIG. 17.

In the present embodiment, the features unique to the present embodiment will be mainly described while the contents overlapping those in the above embodiments are not elaborated upon here. The banknote handling device of the present embodiment has a structure similar to that of Embodiment 2 except that the light-receiving unit has the structure shown in FIG. 16 and the details and the timings of turning on the light sources and the light-receiving units (light receivers) are as shown in FIG. 17 and FIG. 18. In the present embodiment, red light received by the light-receiving units corresponds to the first incident light and infrared light received by the light-receiving units corresponds to the second incident light. Also, blue light received by the light-receiving units corresponds to the third incident light and green light received by the light-receiving units corresponds to the fourth incident light.

Figure 16:
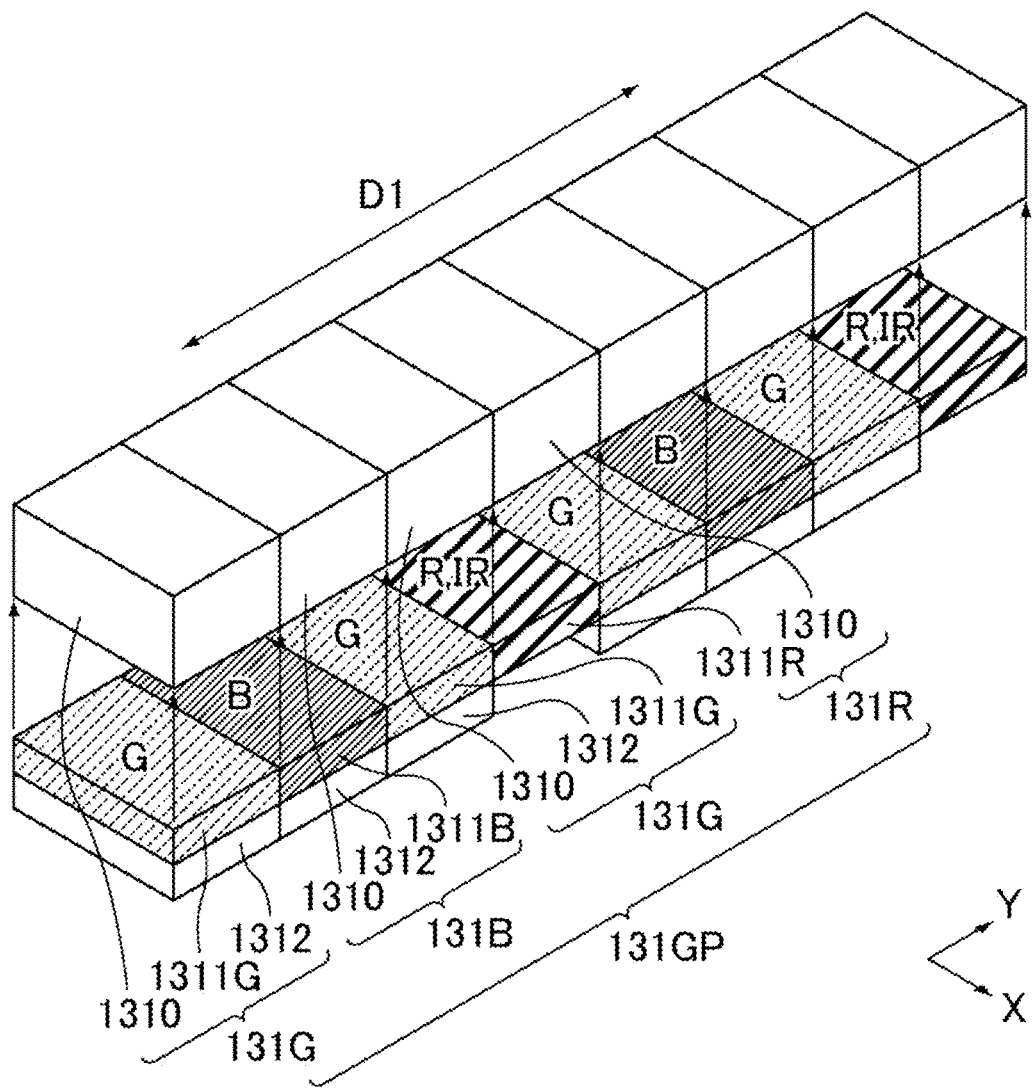
FIG. 16 is an enlarged schematic perspective view of a light-receiving unit in a banknote recognition unit according to Embodiment 5.

As shown in FIG. 16, each pixel in the present embodiment includes one red light-receiving element 131R that receives infrared light and red light and that receives neither green light nor blue light; two green light-receiving elements 131G that receive green light and that receives none of infrared light, red light, and blue light; and one blue light-receiving element 131B that receives blue light and that receives none of infrared light, red light, and green light. In the present embodiment, the red light-receiving element 131R corresponds to the first light-receiving element, the blue light-receiving element 131B corresponds to the second light-receiving element, and the green light-receiving elements 131G each correspond to the third light-receiving element.

As shown in FIG. 16, the red light-receiving element 131R includes a photodetector 1310 and a red color filter 1311R that transmits infrared light and red light and that absorbs green light and blue light. Each green light-receiving element 131G includes a photodetector 1310, a green color filter 1311G that transmits infrared light and green light and that absorbs red light and blue light, and an infrared cut-off filter 1312 that cuts off infrared light. The blue light-receiving element 131B includes a photodetector 1310, a blue color filter 1311B that transmits infrared light and blue light and that absorbs red light and green light, and an infrared cut-off filter 1312 that cuts off infrared light. These filters each function as a filter to reduce transmission of the corresponding light through the filter.

As shown in FIG. 17 and FIG. 18, the light source control unit 11 causes the light sources 111 and 124 for the light-receiving unit 113 to emit red light serving as the first irradiation light and infrared lights (first to third infrared lights) serving as the second irradiation light at different timings. Similarly, the light source control unit 11 causes the light sources 121 for the light-receiving unit 123 to emit red light and infrared lights (first to third infrared lights) at different timings. Thereby, the red light-receiving element 131R can receive red light and infrared lights (first to third infrared lights) at different timings.

The light source control unit 11 causes the light sources 111 and 124 for the light-receiving unit 113 to emit blue light serving as the third irradiation light and at least one of red light serving as the first irradiation light or infrared light serving as the second irradiation light at the same timing. Similarly, the light source control unit 11 causes the light sources 121 for the light-receiving unit 123 to emit blue light and at least one of red light or infrared light at the same timing. In either case, the blue light-receiving element 131B can receive blue light and simultaneously the red light-receiving element 131R can receive red light or infrared light (one of first to third infrared lights).

The light source control unit 11 causes the light sources 111 and 124 for the light-receiving unit 113 to emit green light serving as the fourth irradiation light and at least one of red light serving as the first irradiation light or infrared light serving as the second irradiation light at the same timing. Similarly, the light source control unit 11 causes the light sources 121 for the light-receiving unit 123 to emit green light and at least one of red light or infrared light at the same timing. In either case, the green light-receiving elements 131G can receive green light and simultaneously the red light-receiving element 131R can receive red light or infrared light (one of first to third infrared lights).

The following specifically describes the control of (the timings of turning on) the light sources 111, 121, and 124 by the light source control unit 11 and the timings of light reception by the light-receiving units 113 and 123. In the present embodiment, Phases 1, 3, 5, and 7, which are different from those in Embodiment 2, will be described while the other phases, which are the same as those in Embodiment 2, are not elaborated upon here.

As shown in FIG. 17 and FIG. 18, in Phase 1, the transmission light source 124 emits infrared light (TIR) as the second irradiation light and green light (TG) as the fourth irradiation light simultaneously to the side B of a banknote, and the light-receiving unit 113 receives the second incident light (infrared light (TIR)), which is light generated from the second irradiation light while the second irradiation light is applied to the banknote, and a fourth incident light (green light (TG)), which is light generated from the fourth irradiation light while the fourth irradiation light is applied to the banknote. More specifically, the red light-receiving element 131R detects the second incident light (TIR), which is light generated by transmission of the second irradiation light through the banknote, and the green light-receiving elements 131G detect the fourth incident light (green light (TG)), which is light generated by transmission of the fourth irradiation light through the banknote. Also, in Phase 1, the reflection light source 121 upstream of the transport direction for banknotes emits the first infrared light (IR1L) to the side B of the banknote and the red light-receiving element 131R of the light-receiving unit 123 detects the first infrared light (IR1L) reflected on the side B of the banknote.

As shown in FIG. 17 and FIG. 18, in Phases 3, 5 and 7, the reflection light sources 111 emit as the second irradiation light the first infrared light (IR1), the second infrared light (IR2), and the third infrared light (IR3), respectively, to the side A of the banknote, and the light-receiving unit 113 receives the second incident light (first infrared light (IR1), second infrared light (IR2), and third infrared light (IR3)) each of which is light generated from the second irradiation light while the second irradiation light is applied to the banknote. More specifically, in Phases 3, 5, and 7, the red light-receiving element 131R detects as the second incident light the first infrared light (IR1), the second infrared light (IR2), and the third infrared light (IR3), respectively, each of which is light generated by reflection of the second irradiation light, i.e., the first infrared light (IR1), the second infrared light (IR2), and the third infrared light (IR3), on the side A of the banknote. Similarly, in Phase 3, the reflection light source 121 downstream of the transport direction for banknotes emits the first infrared light (IR1R) to the side B of the banknote and the red light-receiving element 131R of the light-receiving unit 123 detects the first infrared light (IR1R) reflected on the side B of the banknote. Further, in Phases 5 and 7, the reflection light sources 121 emit respectively the second infrared light (IR2) and the third infrared light (IR3) to the side B of the banknote and the red light-receiving element 131R of the light-receiving unit 123 detects respectively the second infrared light (IR2) and the third infrared light (IR3) reflected on the side B of the banknote.

In the present embodiment, the red light and the infrared light received by the light-receiving units are defined respectively as the first incident light and the second incident light. Still, a combination of the first incident light and the second incident light is any combination of infrared light and red light. Infrared light may be defined as the first incident light and red light may be defined as the second incident light. Also, in the present embodiment, blue light and green light received by the light-receiving units are defined respectively as the third incident light and the fourth incident light. Still, a combination of the third incident light and the fourth incident light is any combination of green light and blue light. The third incident light may be green light and the fourth incident light may be blue light. In the case where the third incident light is green light and the fourth incident light is blue light, the green light-receiving elements 131G each correspond to the second light-receiving element and the blue light-receiving element 131B corresponds to the third light-receiving element.

(Modification 1)

In Embodiment 2, one of infrared light and blue light is the first incident light and the other is the second incident light, and one of green light and red light is the third incident light and the other is the fourth incident light. In Embodiments 3 and 4, one of infrared light and green light is the first incident light and the other is the second incident light, and one of blue light and red light is the third incident light and the other is the fourth incident light. In Embodiment 5, one of infrared light and red light is the first incident light and the other is the second incident light, and one of blue light and green light is the third incident light and the other is the fourth incident light. The types of light corresponding to the first to fourth incident lights are not limited thereto. For example, (1) one of blue light and red light may be the first incident light and the other may be the second incident light, as well as one of infrared light and green light may be the third incident light and the other may be the fourth incident light. Alternatively, (2) one of green light and red light may be the first incident light and the other may be the second incident light, as well as one of infrared light and blue light may be the third incident light and the other may be the fourth incident light. Alternatively, (3) one of blue light and green light may be the first incident light and the other may be the second incident light, as well as one of infrared light and red light may be the third incident light and the other may be the fourth incident light.

(Modification 2)

In Embodiments 2 to 5, the timing of receiving the fluorescence is different from the timings of receiving the reflected lights and transmitted lights. Alternatively, the fluorescence may be received at the same timing as the reflected light and/or transmitted light. For example, in the case of using the banknote handling device of Embodiment 2 for handling banknotes that, when irradiated with ultraviolet light, generate blue fluorescence but generate neither green nor red fluorescence, ultraviolet light serving as the first irradiation light, green light serving as the third irradiation light, and red light serving as the fourth irradiation light may be emitted simultaneously. In this case, the blue light-receiving element 131B may detect the first incident light (blue component (UVB) of fluorescence), which is fluorescence generated by irradiation of a banknote with the first irradiation light; the green light-receiving elements 131G may detect the third incident light (green light), which is light generated by reflection of the third irradiation light on the banknote; and the red light-receiving element 131R may detect the fourth incident light (red light), which is light generated by reflection of the fourth irradiation light on the banknote.

(Modification 3)

Described in Embodiments 2 to 5 is the case where an LED element that emits blue light, an LED element that emits green light, and an LED element that emits red light are simultaneously turned on to irradiate a banknote BN with white light. Alternatively, for example, an LED element that emits blue light as well as a red fluorescent substance and a green fluorescent substance that are excited by the light (blue light) to emit red light and green light, respectively, may be used to generate white light and this white light may be applied to a banknote BN. Alternatively, an LED element that emits blue light and a yellow fluorescent substance that is excited by the light (blue light) to emit its complementary color, yellow, may be used to generate white light and this white light may be applied to a banknote BN. In any case, irradiation lights of a plurality of different wavelength bands can be applied to a banknote BN simultaneously. Even in the case of using an LED element that emits blue light and a yellow fluorescent substance, the white light typically contains green light and red light. Thus, the green light and the red light can be used as two of the first to fourth lights as described above.

(Modification 4)

In Embodiments 2 to 5, the light-receiving units (light receivers) used include three types of light-receiving elements to receive at least four types of incident light (first to fourth incident lights) having different wavelength bands. Alternatively, a light-receiving unit (light receiver) including four or less types (e.g., four types) of light-receiving units may be used to receive five or more types (e.g., five types) of incident lights having different wavelength bands and may be similarly controlled by the light source control unit 11.

(Modification 5)

Described in Embodiments 1 to 5 is the case where the optical sensor of the present disclosure functions as an optical line sensor that acquires optical data (optical features) of a banknote over the entire width of the transport path of the banknote handling device. Alternatively, the optical sensor of the present disclosure may be a point sensor that acquires optical data (optical features) of a banknote at one point of the width of the transport path of the banknote handling device.

Embodiments of the present disclosure have been described above with reference to the drawings. The present disclosure is not limited to these embodiments. Also, the structures of the embodiments may be combined or modified as appropriate within the range not departing from the gist of the disclosure.

INDUSTRIAL APPLICABILITY

As described above, the present disclosure is directed to a technique useful for detecting a plurality of types of light having different wavelength bands from a sheet in transport.

What is claimed is:

1. An optical sensor, comprising:
    a light source to emit irradiation light to a target;
    a light receiver comprising:
        a first light-receiving element to receive a first incident light, receive a second incident light, to not receive a third incident light, and to not receive a fourth incident light, wherein the first incident light, the second incident light, the third incident light, and the fourth incident light travel from the target and have different wavelength bands;
        a second light-receiving element to receive the third incident light and to receive none of the first incident light, the second incident light, and the fourth incident light; and
        a third light-receiving element to receive a fourth incident light and to receive none of the first incident light, the second incident light, and the third incident light; and
    a controller configured to control the light source, wherein
    the first light-receiving element comprises a filter which transmits the first incident light and the second incident light and reduces transmission of the third incident light and the fourth incident light,
    the second light-receiving element comprises:
        a first filter to transmit the second incident light and the third incident light and to reduce transmission of the first incident light and the fourth incident light; and
        a second filter to reduce transmission of the second incident light, and
    the third light-receiving element comprises:
        a third filter to transmit the second incident light and the fourth incident light and to reduce transmission of the first incident light and the third incident light; and
        a fourth filter to reduce transmission of the second incident light.

2. A sheet recognition unit, comprising:
    a housing; and
    the optical sensor according to claim 1.

3. The optical sensor according to claim 1, wherein
    the light source emits a first irradiation light, a second irradiation light and a third irradiation light having different wavelength bands,
    the first incident light is light generated from the first irradiation light while the first irradiation light is applied to the target,
    the second incident light is light generated from the second irradiation light while the second irradiation light is applied to the target, and
    the third incident light is light generated from the third irradiation light while the third irradiation light is applied to the target.

4. The optical sensor according to claim 3, wherein
    the first incident light is light generated by transmission of the first irradiation light through the target and/or reflection of the first irradiation light on the target,
    the second incident light is light generated by transmission of the second irradiation light through the target and/or reflection of the second irradiation light on the target, and
    the third incident light is light generated by transmission of the third irradiation light through the target and/or reflection of the third irradiation light on the target.

5. The optical sensor according to claim 3, wherein the controller is configured to control the light source to emit the first irradiation light and the second irradiation light at different timings.

6. The optical sensor according to claim 3, wherein the controller is configured to control the light source to emit the third irradiation light and at least one of the first irradiation light or the second irradiation light at a same timing.

7. The optical sensor according to claim 3, wherein the light source emits a fourth irradiation light to the target, the fourth irradiation light having a wavelength band different from the wavelength bands of the first irradiation light, the second irradiation light and the third irradiation light, and the fourth incident light is light generated from the fourth irradiation light while the fourth irradiation light is applied to the target.

8. The optical sensor according to claim 7, wherein the fourth incident light is light generated by transmission of the fourth irradiation light through the target and/or reflection of the fourth irradiation light on the target.

9. The optical sensor according to claim 7, wherein the controller is configured to control the light source to emit the fourth irradiation light and at least one of the first irradiation light or the second irradiation light at a same timing.

10. The optical sensor according to claim 3, wherein a combination of the first incident light, the second incident light, the third incident light, and the fourth incident light is a combination of infrared light, red light, green light, and blue light.

11. The optical sensor according to claim 10, wherein
a combination of the first incident light and the second incident light is a combination of infrared light and blue light, and
the a combination of third incident light and the fourth incident light is a combination of red light and green light.

12. The optical sensor according to claim 11, wherein the light source comprises:
a first light source to emit infrared light, blue light, red light, and green light to a light receiver side of the target; and
a second light source to emit green light to an opposite side of the target.

13. The optical sensor according to claim 12, wherein
the second light source emits the infrared light to the opposite side of the target,
the controller is configured to control the second light source to emit the infrared light to the opposite side of the target and the green light to the opposite side of the target at a same timing,
the first light-receiving element receives the infrared light transmitted through the target as the first incident light or the second incident light, and
the second light-receiving element receives the green light transmitted through the target as the third incident light.

14. The optical sensor according to claim 10, wherein
a combination of the first incident light and the second incident light is a combination of infrared light and green light, and
a combination of the third incident light and the fourth incident light is a combination of red light and blue light.

15. The optical sensor according to claim 10, wherein
a combination of the first incident light and the second incident light is a combination of infrared light and red light, and
a combination of the third incident light and the fourth incident light is a combination of green light and blue light.

16. The optical sensor according to claim 10, wherein
the infrared light has a peak wavelength at 750 nm or longer,
the red light has a peak wavelength at 600 nm or longer and shorter than 750 nm,
the green light has a peak wavelength at 500 nm or longer and shorter than 600 nm, and
the blue light has a peak wavelength at 400 nm or longer and shorter than 500 nm.

* * * * *